(12) United States Patent
Cho et al.

(10) Patent No.: US 11,614,834 B2
(45) Date of Patent: Mar. 28, 2023

(54) DISPLAY DEVICE

(71) Applicant: Samsung Display Co., Ltd., Yongin-Si (KR)

(72) Inventors: Hyun-Wook Cho, Yonginsi (KR); Min-Hong Kim, Hwaseongsi (KR); Taejoon Kim, Seongnam-si (KR); Jungmok Park, Hwaseong-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/583,729

(22) Filed: Jan. 25, 2022

(65) Prior Publication Data

US 2022/0326833 A1 Oct. 13, 2022

(30) Foreign Application Priority Data

Apr. 12, 2021 (KR) .......................... 10-2021-0047036

(51) Int. Cl.
*G06F 3/041* (2006.01)
*G06F 3/044* (2006.01)

(52) U.S. Cl.
CPC ........ *G06F 3/04184* (2019.05); *G06F 3/0412* (2013.01); *G06F 3/0446* (2019.05); *G06F 2203/04112* (2013.01)

(58) Field of Classification Search
CPC ................. G06F 3/0412; G06F 3/0416–04186
See application file for complete search history.

(56) References Cited

U.S. PATENT DOCUMENTS

| | | | | |
|---|---|---|---|---|
| 6,424,094 | B1* | 7/2002 | Feldman | G06F 3/0412 |
| | | | | 345/206 |
| 9,766,730 | B2 | 9/2017 | Lee | |
| 10,042,454 | B2* | 8/2018 | Kida | H03K 17/9622 |
| 10,429,992 | B2* | 10/2019 | Jung | G06F 3/044 |
| 10,592,029 | B2* | 3/2020 | Takada | G06F 3/0445 |
| 10,635,230 | B2* | 4/2020 | Matsui | G06F 3/0416 |
| 10,732,744 | B2* | 8/2020 | Cho | G06F 3/044 |
| 11,086,447 | B2* | 8/2021 | Bae | G09G 3/20 |

(Continued)

FOREIGN PATENT DOCUMENTS

| KR | 10-2016-0032768 A | 3/2016 |
|---|---|---|
| KR | 10-2022-0008994 A | 1/2022 |

*Primary Examiner* — Patrick F Marinelli
(74) *Attorney, Agent, or Firm* — Innovation Counsel LLP

(57) ABSTRACT

Disclosed is a display device including a display panel, an input sensing layer, a display controller that receives a vertical synchronization signal and a horizontal synchronization signal and controls an operation of the display panel depending on the vertical synchronization signal and the horizontal synchronization signal, and a sensing controller that receives the vertical synchronization signal and the horizontal synchronization signal and generates a driving control signal for driving the input sensing layer. One frame of the vertical synchronization signal includes a first vertical section and a second vertical section in which the display controller transmits a data signal to the display panel. The sensing controller determines an operating frequency of the driving control signal based on a horizontal synchronization signal, which is included in a first horizontal section overlapping with the first vertical section, in the horizontal synchronization signal.

20 Claims, 17 Drawing Sheets

(56) References Cited

U.S. PATENT DOCUMENTS

| | | | |
|---|---|---|---|
| 2013/0069894 A1* | 3/2013 | Chen | G06F 3/0445 |
| | | | 345/173 |
| 2015/0355783 A1* | 12/2015 | Hung | G06F 3/04184 |
| | | | 345/173 |
| 2017/0147143 A1* | 5/2017 | Jung | G06F 3/0418 |
| 2018/0074633 A1* | 3/2018 | Kida | G06F 3/0446 |
| 2018/0300000 A1* | 10/2018 | Takada | G06F 3/0412 |
| 2019/0369804 A1* | 12/2019 | Jung | G06F 3/0418 |
| 2020/0393949 A1* | 12/2020 | Kim | G06F 3/04166 |
| 2021/0055848 A1* | 2/2021 | Bae | G09G 3/20 |
| 2021/0090523 A1* | 3/2021 | Huang | G09G 3/20 |
| 2021/0097905 A1* | 4/2021 | Garden | G06Q 20/203 |
| 2021/0244326 A1* | 8/2021 | Nishimura | B60W 50/12 |
| 2022/0019332 A1* | 1/2022 | Ko | G06F 1/3265 |
| 2022/0020333 A1* | 1/2022 | Cho | G06F 3/04184 |
| 2022/0155937 A1* | 5/2022 | Jo | G06F 3/0446 |

* cited by examiner

DISPLAY DEVICE

CROSS-REFERENCE TO RELATED APPLICATIONS

This application claims priority under 35 U.S.C. § 119 to Korean Patent Application No. 10-2021-0047036 filed on Apr. 12, 2021, in the Korean Intellectual Property Office, the disclosures of which are incorporated by reference herein in their entireties.

BACKGROUND

The present disclosure described relates to a display device, and more particularly, relates to a display device with an input sensing function.

There are being developed various display devices that are used in a multi-media device such as a television, a mobile phone, a tablet computer, a navigation system, or a game console.

As fields of use of these display devices are diversified, the types of images displayed on display devices are also diversified. As the display device is driven at a high frequency to display an image on a display device, power consumption of the display device increases. Accordingly, an operating frequency of the display device may be adjusted depending on an image displayed on the display device.

Besides, display devices may also detect a touch-based input such that a user is capable of easily and intuitively entering information or commands, in addition to a general input scheme such as a button, a keyboard, a mouse, or the like.

SUMMARY

According to an embodiment, a display device includes a display panel that displays an image and an input sensing layer disposed on the display panel and sensing an input applied from an outside. The display device includes a display controller that receives a vertical synchronization signal and a horizontal synchronization signal and controls an operation of the display panel depending on the vertical synchronization signal and the horizontal synchronization signal. The display device includes a sensing controller that receives the vertical synchronization signal and the horizontal synchronization signal and generates a driving control signal for driving the input sensing layer. One frame of the vertical synchronization signal includes a first vertical section and a second vertical section in which the display controller transmits a data signal for displaying the image to the display panel. The sensing controller determines an operating frequency of the driving control signal based on a horizontal synchronization signal, which is included in a first horizontal section overlapping with the first vertical section, in the horizontal synchronization signal.

In an embodiment of the present disclosure, the horizontal synchronization signal may include a plurality of pulses. The sensing controller may determine the operating frequency of the driving control signal based on a plurality of pulses, which are included in the first horizontal section, from among pulses of the horizontal synchronization signal.

In an embodiment of the present disclosure, the sensing controller may determine the operating frequency of the driving control signal by counting the number of the pulses of the horizontal synchronization signal included in the first horizontal section.

In an embodiment of the present disclosure, the display controller may operate in a first mode, in which the display panel is operated at a first frequency, or in a second mode, in which the display panel the display panel is operated at a second frequency less than the first frequency, depending on the image. When the display controller operates in the first mode, a frequency of the vertical synchronization signal may be the first frequency. When the display controller operates in the second mode, the frequency of the vertical synchronization signal may be the second frequency.

In an embodiment of the present disclosure, the number of the pulses included in the first horizontal section is 'n' when the vertical synchronization signal has the first frequency, and the number of the pulses included in the first horizontal section is 'm' when the vertical synchronization signal has the second frequency, each of 'n' and 'm' may be a natural number that is not less than 1, and 'n' may be a natural number greater than 'm'.

In an embodiment of the present disclosure, when the number of the pulses included in the first horizontal section is 'n', the operating frequency of the driving control signal may be a first operating frequency. When the number of the pulses included in the first horizontal section is 'm', the operating frequency of the driving control signal may be a second operating frequency less than the first operating frequency.

In an embodiment of the present disclosure, the horizontal synchronization signal may include a plurality of pulses. The horizontal synchronization signal may include a second horizontal section overlapping with the second vertical section.

In an embodiment of the present disclosure, pulses of the horizontal synchronization signal may include a first pulse included in the first horizontal section and a plurality of second pulses included in the second horizontal section.

In an embodiment of the present disclosure, a width of the first pulse may be different from a width of each of the second pulses.

In an embodiment of the present disclosure, the sensing controller may determine the operating frequency of the driving control signal based on the width of the first pulse.

In an embodiment of the present disclosure, the display controller may operate in a first mode, in which the display panel is operated at a first frequency, or in a second mode, in which the display panel the display panel is operated at a second frequency less than the first frequency, depending on the image.

In an embodiment of the present disclosure, a width of the first pulse is a first width when the display controller operates in the first mode, and the width of the first pulse is a second width when the display controller operates in the second mode, the first width may be greater than the second width.

In an embodiment of the present disclosure, when the width of the first pulse is the first width, the operating frequency of the driving control signal may be a first operating frequency. When the width of the first pulse is the second width, the operating frequency of the driving control signal may be a second operating frequency less than the first operating frequency.

In an embodiment of the present disclosure, the width of each of the second pulses when the display controller operates in the first mode may be different from the width of each of the second pulses when the display controller operates in the second mode.

In an embodiment of the present disclosure, the width of each of the second pulses when the display controller operates in the first mode may be less than the width of each of the second pulses when the display controller operates in the second mode.

In an embodiment of the present disclosure, pulses of the horizontal synchronization signal may include a plurality of first pulses included in the first horizontal section and a plurality of second pulses included in the second horizontal section. The display controller may operate in a first mode, in which the display panel is operated at a first frequency, or in a second mode, in which the display panel the display panel is operated at a second frequency less than the first frequency, depending on the image. The sensing controller may determine the operating frequency of the driving control signal by counting the number of the first pulses. The width of each of the first pulses when the display controller operates in the first mode may be equal to the width of each of the first pulses when the display controller operates in the second mode. The number of the first pulses when the display controller operates in the first mode may be different from the number of the first pulses when the display controller operates in the second mode.

In an embodiment of the present disclosure, the number of the first pulses is 'k' when the display controller operates in the first mode, and the number of the first pulses is 'l' when the display controller operates in the second mode, each of 'k' and 'l' may be a natural number that is not less than 1, and 'k' may be a natural number greater than 'l'. When the number of the first pulses is 'k', the operating frequency of the driving control signal may be a first operating frequency. When the number of the first pulses is 'l', the operating frequency of the driving control signal may be a second operating frequency less than the first operating frequency.

In an embodiment of the present disclosure, the operating frequency of the driving control signal may be equal to or greater than a frequency of the vertical synchronization signal.

In an embodiment of the present disclosure, the sensing controller may include a calculator that generates a frequency control signal based on a pulse of the horizontal synchronization signal included in the first horizontal section. The sensing controller may further include a generator that generates the driving control signal having the operating frequency based on the frequency control signal.

In an embodiment of the present disclosure, the frequency control signal may include information about a frequency of the vertical synchronization signal.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
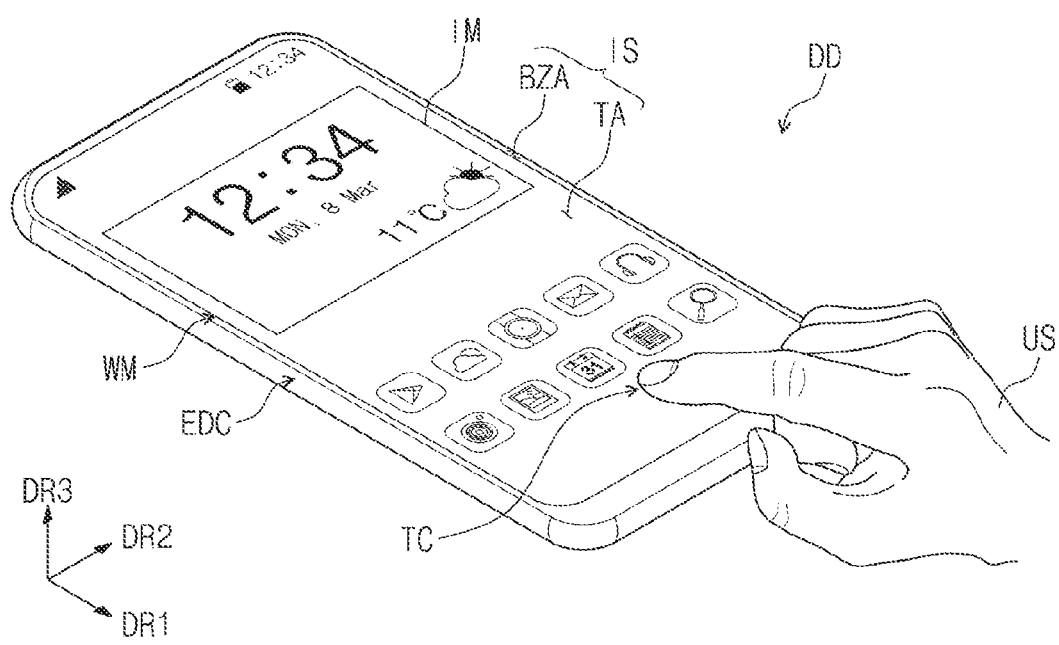
FIG. 1 is a perspective view of a display device, according to an embodiment of the present disclosure.

Embodiments of the present disclosure provide a display device capable of reducing noise generation between a display panel and an input sensing layer.

In this specification, when a component (or area, layer, portion, or the like) is described as being "on", "connected to", or "coupled to" another component, it means that the component may be directly positioned/connected/coupled on the other component or a third component may be interposed between them.

Like reference numerals refer to like components. Also, in drawings, the thickness, ratio, and dimension of components are exaggerated for effectiveness of description of technical contents.

As used herein, the word "or" means logical "or" so, unless the context indicates otherwise, the expression "A, B, or C" means "A and B and C," "A and B but not C," "A and C but not B," "B and C but not A," "A but not B and not C," "B but not A and not C," and "C but not A and not B."

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in commonly used dictionaries should be interpreted as having a meaning consistent with the meaning in the context of the related technology, and should not be interpreted in an overly ideal or overly formal sense unless explicitly defined herein.

Hereinafter, embodiments of the present disclosure will be described with reference to accompanying drawings.

Figure 2:
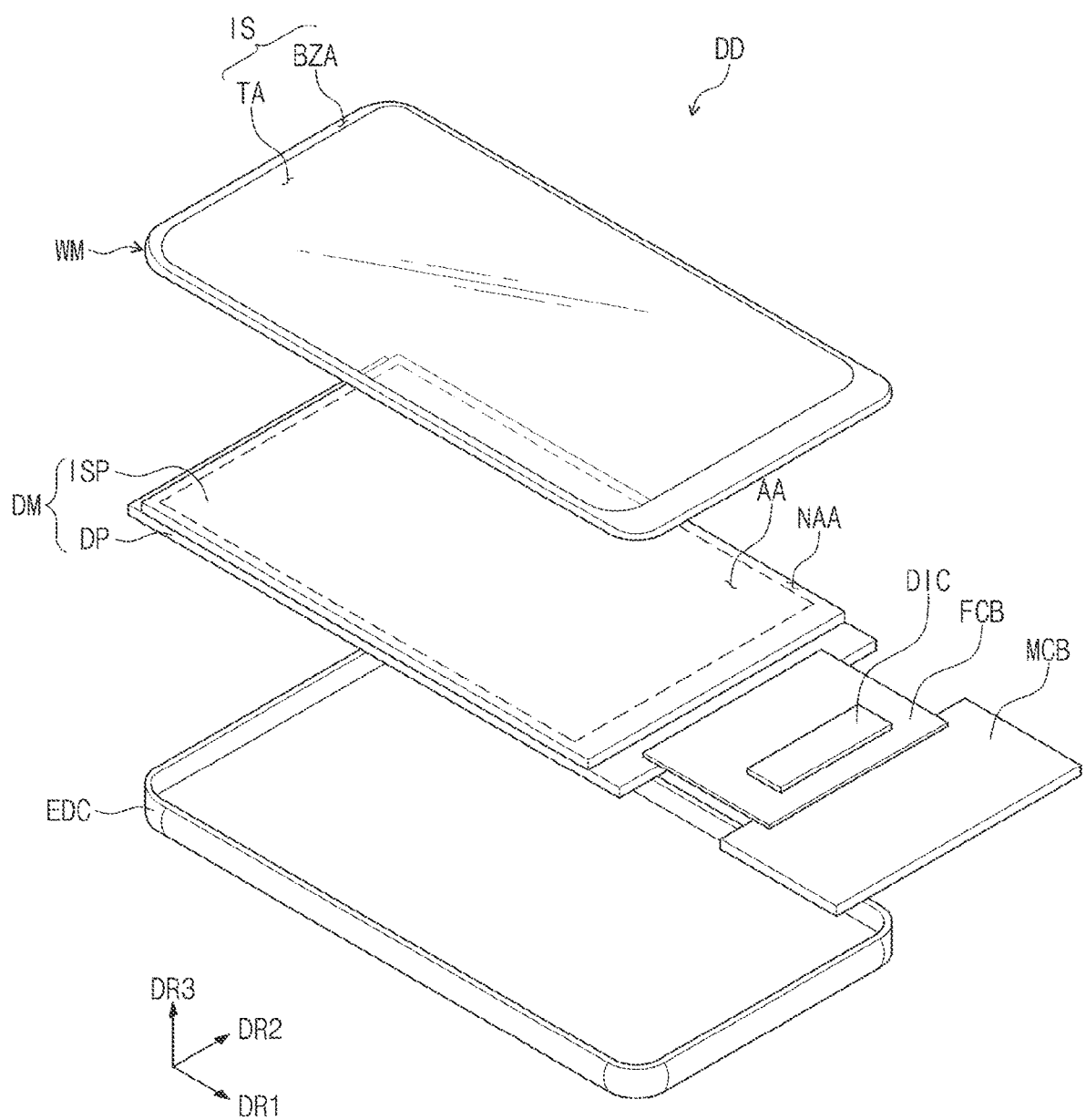
FIG. 2 is an exploded perspective view of a display device illustrated in FIG. 1.

FIG. 1 is a perspective view of a display device, according to an embodiment of the present disclosure. FIG. 2 is an exploded perspective view of a display device illustrated in FIG. 1.

Referring to FIGS. 1 and 2, a display device DD may be a device activated depending on an electrical signal. According to an embodiment of the present disclosure, the display device DD may be a small and medium-sized electronic device, such as a mobile phone, a tablet PC, a vehicle navigation system, a game console, or the like as well as a large-sized electronic device, such as a television, a monitor, or the like. These are just presented as embodiments. It is obvious that these are capable of being employed in other electronic devices as long as these do not depart from the concept of the present disclosure.

The display device DD has a rectangular shape having a long side in a first direction DR1 and a short side in a second direction DR2 crossing in the first direction DR1. However, the shape of the display device DD is not limited thereto, and various shapes of the display device DD may be provided. The display device DD may display an image IM on a display surface IS, which is parallel to each of the first direction DR1 and the second direction DR2, in a third direction DR3. The display surface IS on which the image IM is displayed may correspond to a front surface of the display device DD.

In an embodiment, a front surface (or an upper surface) and a back surface (or a lower surface) of each member are defined with respect to a direction in which the image IM is displayed. The front surface may oppose the back surface in the third direction DR3, and a normal direction of each of the front surface and the back surface may be parallel to the third direction DR3.

The separation distance between the front surface and the back surface in the third direction DR3 may correspond to the thickness in the third direction DR3 of the display device DD. Meanwhile, directions that the first, second, and third directions DR1, DR2, and DR3 indicate may be a relative concept and may be changed to different directions.

The display device DD may detect an external input applied from the outside. The external input may include various types of inputs provided from the outside of the display device DD. The display device DD according to an embodiment of the present disclosure may detect an external input TC of a user US. The external input TC of the user US may be one or a combination of various types of external inputs such as a part of the user's body, light, heat, or pressure. In an embodiment, it is described that the external input TC of the user US is a touch input applied to a front surface by a hand of the user US. However, this is an example. As described above, the external input TC of the user US may be provided in various forms. Besides, the display device DD may detect the external input TC of the user US applied to a side surface or a bottom surface of the display device DD depending on a structure of the display device DD, and may not be limited to an embodiment.

The display device DD according to an embodiment of the present disclosure may detect an externally-applied second input. The second input may include inputs by an input device (e.g., a stylus pen, an active pen, a touch pen, an electronic pen, an e-pen, or the like) other than the hand of the user US.

The front surface of the display device DD may be divided into a transparent area TA and a bezel area BZA. The image IM may be displayed in the transparent area TA. A user visually perceives the image IM through the transparent area TA. In an embodiment, it is illustrated that the transparent area TA is in a rectangular shape with rounded vertices. However, this is illustrated by way of example. For example, the transparent area TA may have various shapes, not limited to an embodiment.

The bezel area BZA is adjacent to the transparent area TA. The bezel area BZA may have a predetermined color. The bezel area BZA may surround the transparent area TA. Accordingly, the shape of the transparent area TA may be substantially defined by the bezel area BZA. However, this is illustrated by way of example. For example, the bezel area BZA may be disposed adjacent to only one side of the transparent area TA or may be omitted. The display device DD according to an embodiment of the present disclosure may be implemented with various embodiments, and is not limited to an embodiment.

As illustrated in FIG. 2, the display device DD may include a display module DM and a window WM disposed on the display module DM. The display module DM may include a display panel DP and an input sensing layer ISP.

The display panel DP according to an embodiment of the present disclosure may be a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, and the like. Hereinafter, in an embodiment, it is described that the display panel DP is an organic light emitting display panel.

The display panel DP may output the image IM, and the output image may be displayed through the display surface IS.

The input sensing layer ISP is disposed on the display panel DP so as to detect the external input TC and the second input. The configuration and operation of the input sensing layer ISP will be described later with reference to FIGS. 5 and 6.

The window WM may be formed of a transparent material capable of projecting the image IM. For example, the window WM may be formed of glass, sapphire, plastic, or the like. The window WM is illustrated as a single layer, but is not limited thereto. For example, the window WM may include a plurality of layers.

In the meantime, although not illustrated in FIG. 1 or 2, the bezel area BZA of the above-described display device DD may be substantially provided as an area in which a material including a predetermined color is printed in one area of the window WM. According to an embodiment of the present disclosure, the window WM may include a light-shielding pattern for defining the bezel area BZA. For example, the light-shielding pattern may be formed by a coating method, as a colored organic film.

The window WM may be coupled to the display module DM through an adhesive film. According to an embodiment of the present disclosure, the adhesive film may include an optically clear adhesive film (OCA). However, the adhesive film is not limited thereto. For example, the adhesive film may include a general adhesive or pressure sensitive adhesive. For example, the adhesive film may include optically clear resin (OCR) or pressure sensitive adhesive film (PSA).

An anti-reflection layer may be further interposed between the window WM and the display module DM. The anti-reflection layer reduces the reflectance of external light incident from an upper surface of the window WM. The anti-reflection layer according to an embodiment of the present disclosure may include a retarder and a polarizer. The retarder may have a film type or a liquid crystal coating type, and may include a λ/2 retarder or a λ/4 retarder. The polarizer may also have a film type or a liquid crystal coating type. A polarizer of the film type may include a stretched synthetic resin film, and a polarizer of the liquid crystal coating type may include liquid crystals arranged in a predetermined array. The retarder and the polarizer may be implemented as one polarizing film.

The display module DM displays an image depending on an electrical signal and may transmit and receive information about an external input. The display module DM may be defined as an effective area AA and an ineffective area NAA. The effective area AA may be defined as an area for projecting an image provided from the display module DM. Also, the effective area AA may be defined as an area where the input sensing layer ISP senses the external input TC and the second input that are applied from the outside.

The ineffective area NAA is adjacent to the effective area AA. For example, the ineffective area NAA may surround the effective area AA. However, this is illustrated by way of example, and the ineffective area NAA may be defined in various shapes, and is not limited to an embodiment. According to an embodiment, the effective area AA of the display module DM may correspond to at least part of the transparent area TA.

The display module DM may further include a main circuit board MCB, a flexible circuit film FCB, and a driving chip DIC. The main circuit board MCB is connected to the flexible circuit film FCB so as to be electrically connected to the display panel DP. The flexible circuit film FCB is connected to the display panel DP to electrically connect the display panel DP to the main circuit board MCB.

The main circuit board MCB may include a plurality of driving elements. The plurality of driving elements may include a circuit unit for driving the display panel DP. The driving chip DIC may be mounted on the flexible circuit film FCB. The flexible circuit film FCB according to an embodiment of the present disclosure is illustrated as one, but is not limited thereto. For example, the plurality of flexible circuit films FCB may be connected to the display panel DP. FIG. 2 illustrates a structure in which the driving chip DIC is mounted on the flexible circuit film FCB, but the present disclosure is not limited thereto. For example, the driving chip DIC may be directly mounted on the display panel DP. In this case, a portion of the display panel DP on which the driving chip DIC is mounted may be bent to be disposed on the back surface of the display module DM. In addition, the driving chip DIC may be directly mounted on the main circuit board MCB.

The input sensing layer ISP may be electrically connected to the main circuit board MCB through the flexible circuit film FCB. However, an embodiment of the present disclosure is not limited thereto. That is, the display module DM may further include a separate flexible circuit film for electrically connecting the input sensing layer ISP to the main circuit board MCB.

The display device DD further includes an external case EDC for accommodating the display module DM. The external case EDC may be coupled to the window WM so as to define an exterior appearance of the display device DD. The external case EDC protects configurations included in the external case EDC by absorbing the shock applied from the outside and preventing foreign objects/moisture getting through the display module DM. Meanwhile, according to an embodiment of the present disclosure, the external case EDC may be provided in a form in which a plurality of storage members are coupled.

The display device DD according to an embodiment may further include an electronic module including various functional modules for operating the display module DM, a power supply module for supplying power required for the overall operation of the display device DD, a bracket coupled to the display module DM or the external case EDC and for dividing the internal space of the display device DD, and the like.

Figure 3:
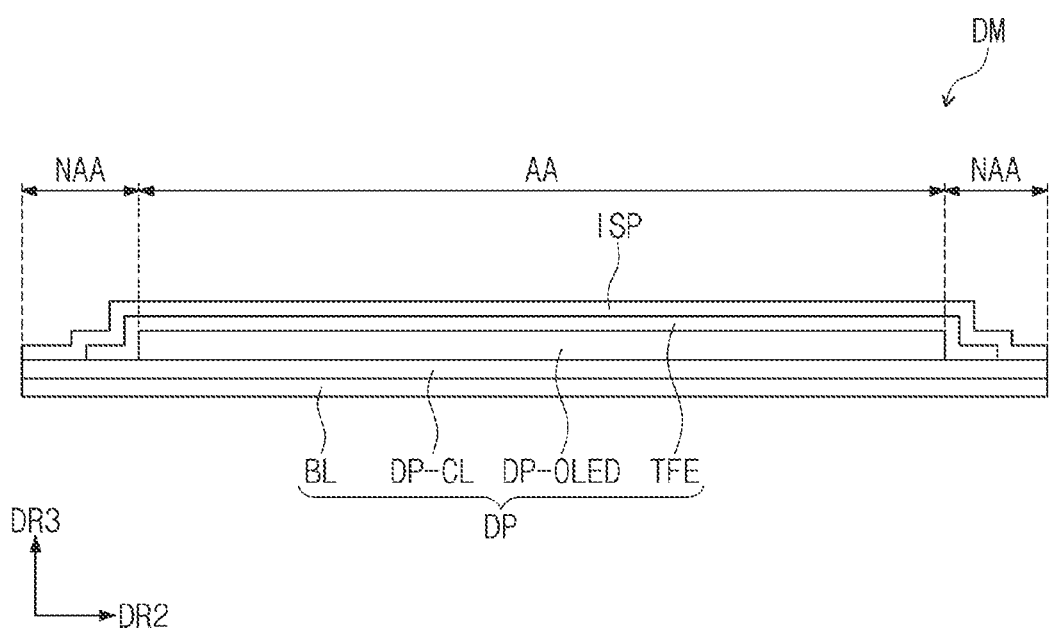
FIG. 3 is a cross-sectional view of the display module illustrated in FIG. 2.

FIG. 3 is a cross-sectional view of the display module illustrated in FIG. 2.

Referring to FIG. 3, the display module DM includes the display panel DP and the input sensing layer ISP. The display panel DP includes a base layer BL, a circuit element layer DP-CL disposed on the base layer BL, a display element layer DP-OLED, and an encapsulation layer TFE. Although not separately shown in FIG. 3, the display panel DP may further include functional layers such as an anti-reflection layer, a refractive-index control layer, and the like.

The base layer BL may include at least one plastic film. The base layer BL may include a plastic substrate, a glass substrate, a metal substrate, or an organic/inorganic composite substrate. In an embodiment of the present disclosure, the base layer BL may be a flexible substrate. The effective area AA and the ineffective area NAA described with reference to FIG. 2 may be equally defined in the base layer BL.

The circuit element layer DP-CL includes at least one intermediate insulating layer and a circuit element. The intermediate insulating layer includes at least one intermediate inorganic layer and at least one intermediate organic layer. The circuit element includes signal lines, a driving circuit of a pixel, and the like.

The display element layer DP-OLED includes a light emitting element. The light emitting element may include at least organic light emitting diodes. The display element layer DP-OLED may further include an organic film such as a pixel defining film.

The encapsulation layer TFE encapsulates the display element layer DP-OLED. The encapsulation layer TFE includes at least one inorganic layer. The encapsulation layer TFE further includes at least one organic layer. The inorganic layer protects the display element layer DP-OLED from moisture and oxygen. The organic layer protects the display element layer DP-OLED from foreign objects such as dust particles. The inorganic layer may include a silicon nitride layer, a silicon oxynitride layer and a silicon oxide layer, a titanium oxide layer, an aluminum oxide layer, or the like. The organic layer may include an acrylate-based organic layer, but is not limited thereto.

The input sensing layer ISP may be formed on the display panel DP by a continuous process. Besides, the input sensing layer ISP and the display panel DP may be coupled to each other through an adhesive film. The input sensing layer ISP may have a multi-layer structure. The input sensing layer ISP may include a single-layer insulating layer or a multi-layer insulating layer. According to an embodiment of the present disclosure, when the input sensing layer ISP is directly disposed on the display panel DP by a continuous process, the input sensing layer ISP is directly disposed on the encapsulation layer TFE, and the adhesive film is not interposed between the input sensing layer ISP and the display panel DP. However, as another example, the adhesive film may be interposed between the input sensing layer ISP and the display panel DP. In this case, the input sensing layer ISP is not manufactured by a continuous process together with the display panel DP. After the input sensing layer ISP is manufactured through a process separate from a process of the display panel DP, the input sensing layer ISP may be fixed on a top surface of the display panel DP by the adhesive film.

However, in an embodiment of the present disclosure, the display panel DP may further include an encapsulation substrate. The encapsulation substrate may be disposed to face the base layer BL on the display element layer DP-OLED. The encapsulation substrate may include a plastic substrate, a glass substrate, a metal substrate, or an organic/inorganic composite substrate. A sealant may be interposed between the encapsulation substrate and the base layer BL. The encapsulation substrate and the base layer BL may be bonded to each other by the sealant. The sealant may include an organic adhesive or frit, which is a ceramic adhesive material, or the like. The display element layer DP-OLED may be sealed by the sealant and the encapsulation substrate.

When the input sensing layer ISP is directly disposed on the display panel DP by a continuous process, the input sensing layer ISP may be directly disposed on the encapsulation substrate. However, as another example, when an adhesive film is interposed between the input sensing layer ISP and the display panel DP, the input sensing layer ISP may be fixed on a top surface of the encapsulation substrate by the adhesive film.

Figure 4:
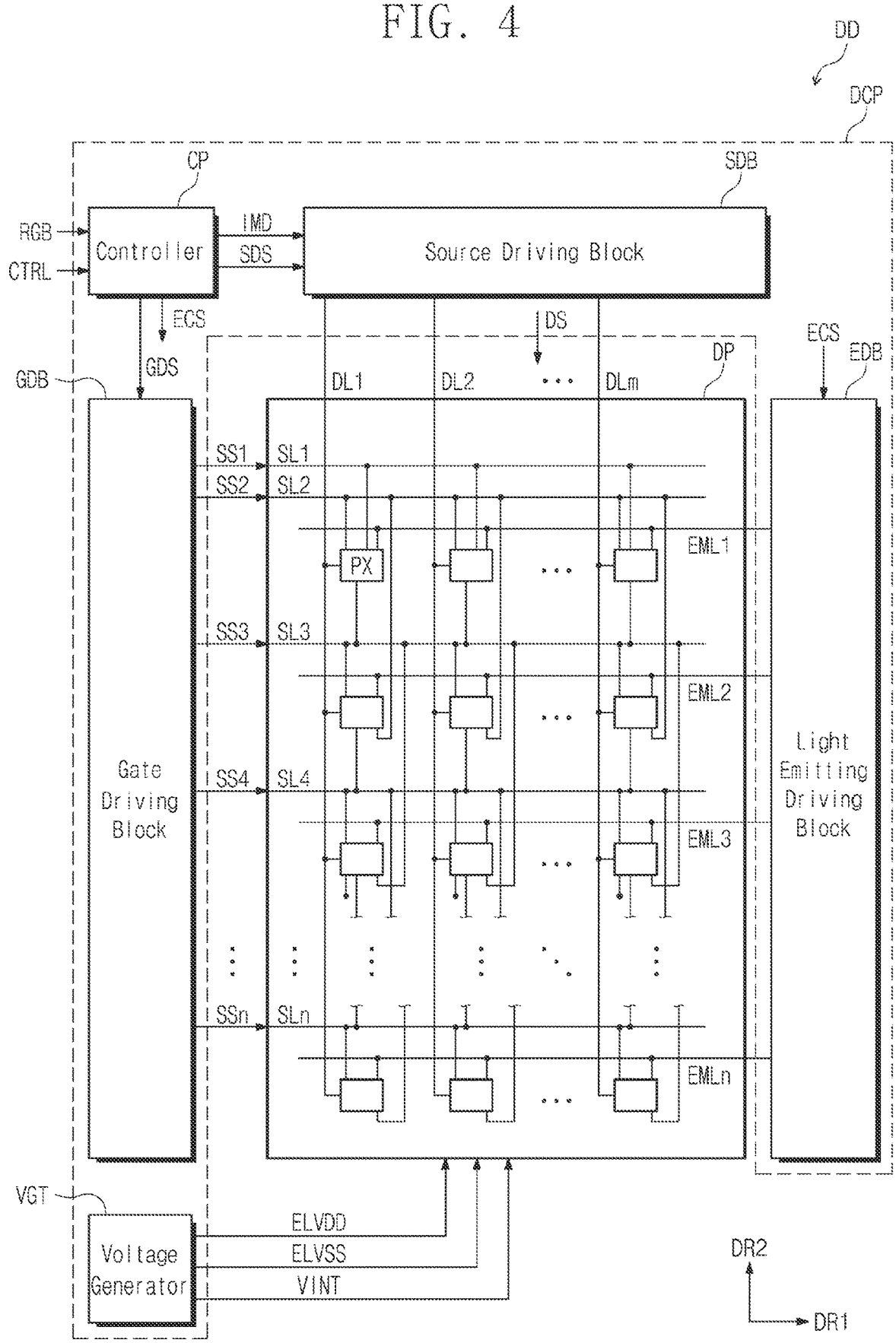
FIG. 4 is a block diagram of a display device, according to an embodiment of the present disclosure.

FIG. 4 is a block diagram of a display device, according to an embodiment of the present disclosure.

Referring to FIG. 4, the display device DD includes the display panel DP and a display controller DCP.

In an embodiment of the present disclosure, the display controller DCP includes a controller CP, a source driving block SDB, a gate driving block GDB, a light emitting driving block EDB, and a voltage generator VGT.

The controller CP receives an image signal RGB and an external control signal CTRL from the outside. The controller CP generates image data IMD by converting the data format of the image signal RGB so as to be suitable for the interface specification with the source driving block SDB. The controller CP generates a source driving signal SDS, a gate driving signal GDS, and a light emission control signal ECS based on the external control signal CTRL. The external control signal CTRL may include a vertical synchronization signal Vsync (see FIG. 7), a horizontal synchronization signal Hsync (see FIG. 7), and a main clock. The controller CP may further generate a masking signal. The controller CP provides the image data IMD and the source driving signal SDS to the source driving block SDB, provides the gate driving signal GDS to the gate driving block GDB, and provides the light emission control signal ECS to the light emitting driving block EDB. The controller CP may further provide the masking signal to the gate driving block GDB.

The source driving block SDB receives the image data IMD and the source driving signal SDS from the controller CP. The source driving signal SDS may include a horizontal start signal for starting an operation of the source driving block SDB. The source driving block SDB converts the image data IMD into a data signal DS in response to the source driving signal SDS, and outputs the data signal DS to a plurality of data lines DL1 to DLm to be described later. The data signal DS is an analog voltage corresponding to a grayscale value of the image data IMD.

The gate driving block GDB receives the gate driving signal GDS from the controller CP. The gate driving signal GDS may include a vertical start signal for starting an operation of the gate driving block GDB, a scan clock signal for determining the output timing of each of scan signals SS1 to SSn, and the like. The gate driving block GDB generates the scan signals SS1 to SSn based on the gate driving signal GDS. The gate driving block GDB outputs the scan signals SS1 to SSn to a plurality of scan lines SL1 to SLn to be described later, respectively. In an embodiment of the present disclosure, the gate driving block GDB may further receive the masking signal from the controller CP. The gate driving block GDB may generate the scan signals SS1 to SSn based on the gate driving signal GDS and the masking signal.

The light emitting driving block EDB receives the light emission control signal ECS from the controller CP. The light emitting driving block EDB may output light emission control signals to light emitting lines EML1 to EMLn in response to the light emission control signal ECS.

The voltage generator VGT generates voltages necessary for an operation of the display panel DP. In an embodiment of the present disclosure, the voltage generator VGT generates a first driving voltage ELVDD, a second driving voltage ELVSS, and an initialization voltage VINT. In an embodiment of the present disclosure, the voltage generator VGT may operate under the control of the controller CP.

In an embodiment of the present disclosure, the display panel DP includes the scan lines SL1 to SLn, the data lines DL1 to DLm, the light emitting lines EML1 to EMLn, and pixels PX. The scan lines SL1 to SLn extend from the gate driving block GDB in the first direction DR1 and are arranged to be spaced from each other in the second direction DR2. The data lines DL1 to DLm extend from the source driving block SDB in a direction opposite to the second direction DR2, and are arranged to be spaced from each other in the first direction DR1.

Each of the plurality of pixels PX is electrically connected to three corresponding scan lines among the scan lines SL1 to SLn. Furthermore, each of the plurality of pixels PX is electrically connected to a corresponding light emitting line among the light emitting lines EML1 to EMLn and a corresponding data line among the data lines DL1 to DLm. For example, as illustrated in FIG. 4, pixels in the first row may be connected to first to third scan lines SL1, SL2, and SL3, and a first light emitting line EML1. The pixels in the first row may be connected to the data lines DL1 to DLm, respectively.

Each of the plurality of pixels PX includes an organic light emitting diode and a pixel circuit unit for controlling the light emission of the organic light emitting diode. The pixel circuit unit may include a plurality of transistors and a capacitor. Each of the plurality of pixels PX receives the first driving voltage ELVDD, the second driving voltage ELVSS, and the initialization voltage VINT.

The pixels PX may include a plurality of groups, each of which has organic light emitting diodes that generate light of different colors from each other. For example, the pixels PX may include red pixels generating red color light, green pixels generating green color light, and blue pixels generating blue color light. An organic light emitting diode of a red pixel, an organic light emitting diode of a green pixel, and an organic light emitting diode of a blue pixel may include light emitting layers of different materials, respectively.

Figure 5:
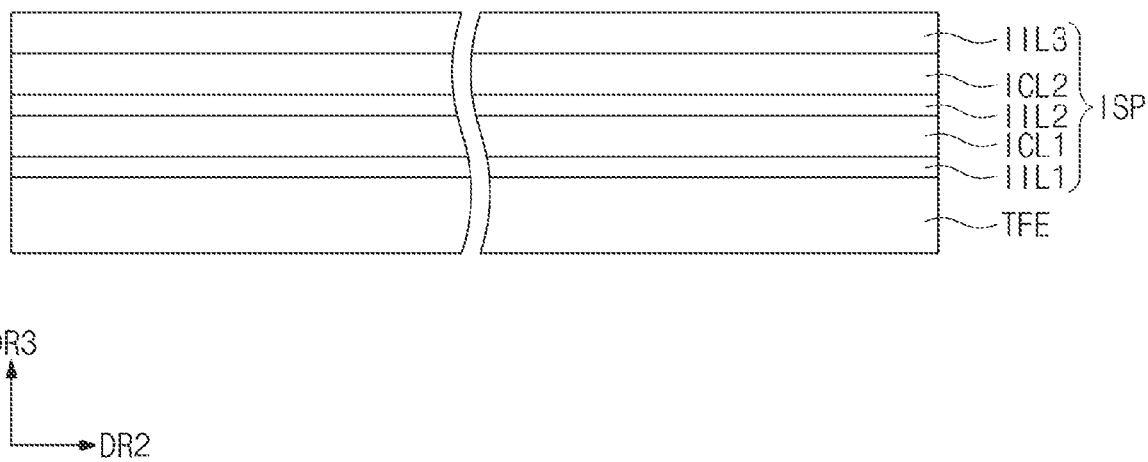
FIG. 5 is a cross-sectional view illustrating a configuration of an input sensing layer, according to an embodiment of the present disclosure.

FIG. 5 is a cross-sectional view illustrating a configuration of an input sensing layer, according to an embodiment of the present disclosure.

Referring to FIG. 5, the input sensing layer ISP according to an embodiment of the present disclosure may include a first sensing insulating layer IIL1, a first conductive layer ICL1, a second sensing insulating layer IIL2, a second conductive layer ICL2, and a third sensing insulating layer IIL3. The first sensing insulating layer IIL1 may be directly disposed on the encapsulation layer TFE. However, in an embodiment of the present disclosure, the first sensing insulating layer IIL1 may be omitted.

Each of the first conductive layer ICL1 and the second conductive layer ICL2 includes a plurality of conductive patterns. The conductive patterns may include a plurality of sensing electrodes SE1_1 to SE1_5 and SE2_1 to SE2_4 (see FIG. 6) and a plurality of signal lines SL1_1 to SL1_5 and SL2_1 to SL2_4 (see FIG. 6) respectively connected to the plurality of sensing electrodes SE1_1 to SE1_5 and SE2_1 to SE2_4.

Each of the first to third sensing insulating layers IIL1 to IIL3 may include an inorganic material or an organic material. In an embodiment, the first sensing insulating layer IIL1 and the second sensing insulating layer IIL2 may be inorganic layers. The inorganic layer may include at least one of aluminum oxide, titanium oxide, silicon oxide, silicon oxynitride, zirconium oxide, and hafnium oxide. The thickness of the inorganic layer may be between 1000 angstroms and 4000 angstroms.

The third sensing insulating layer IIL3 may be an organic layer. The organic layer may include at least one of acrylate-based resin, methacrylate-based resin, polyisoprene-based resin, vinyl-based resin, epoxy-based resin, urethane-based resin, cellulose-based resin, siloxane-based resin, polyimide-based resin, polyamide-based resin, and perylene-based resin. The third sensing insulating layer IIL3 including an organic material may prevent moisture or the like from entering into the first conductive layer ICL1 and the second conductive layer ICL2 from the outside.

Figure 6:
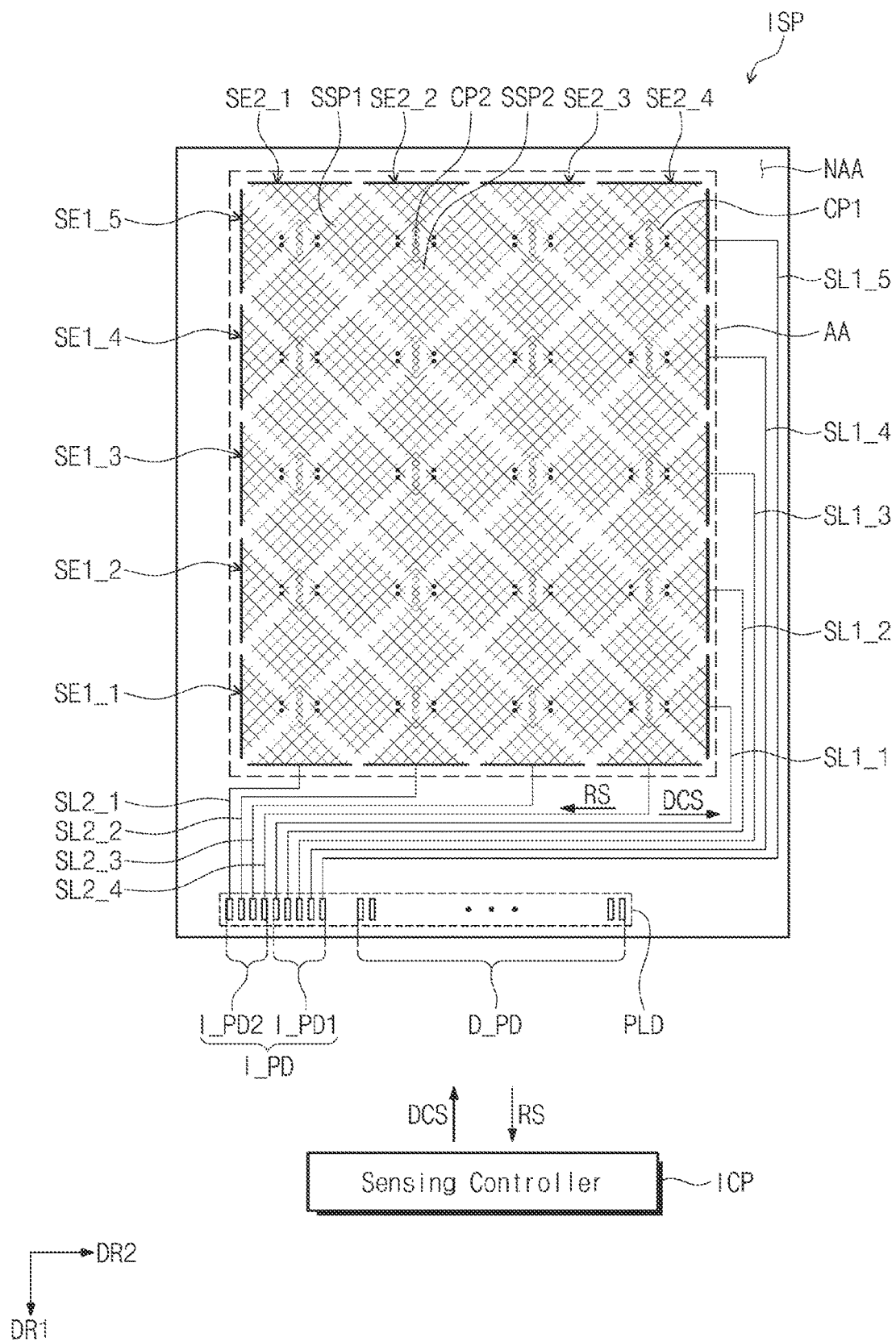
FIG. 6 is a plan view illustrating a configuration of a sensing controller and an input sensing layer, according to an embodiment of the present disclosure.

FIG. 6 is a plan view illustrating a configuration of a sensing controller and an input sensing layer, according to an embodiment of the present disclosure.

Referring to FIG. 6, the input sensing layer ISP according to an embodiment of the present disclosure includes the effective area AA and the ineffective area NAA adjacent to the effective area AA. The plurality of sensing electrodes SE1_1 to SE1_5 and SE2_1 to SE2_4 may be disposed in the effective area AA. The plurality of signal lines SL1_1 to SL1_5 and SL2_1 to SL2_4 may be disposed in the ineffective area NAA.

In an embodiment of the present disclosure, the sensing electrodes SE1_1 to SE1_5 and SE2_1 to SE2_4 include the transmission electrodes SE1_1 to SE1_5 and the reception electrodes SE2_1 to SE2_4.

The signal lines SL1_1 to SL1_5 and SL2_1 to SL2_4 may include the transmission signal lines SL1_1 to SL1_5 respectively connected to the transmission electrodes SE1_1 to SE1_5 and the reception signal lines SL2_1 to SL2_4 respectively connected to the reception electrodes SE2_1 to SE2_4.

The transmission electrodes SE1_1 to SE1_5 and the reception electrodes SE2_1 to SE2_4 cross each other, respectively. The transmission electrodes SE1_1 to SE1_5 are arranged in the first direction DR1. Each of the transmission electrodes SE1_1 to SE1_5 extend in the second direction DR2. The reception electrodes SE2_1 to SE2_4 are arranged in the second direction DR2. Each of the reception electrodes SE2_1 to SE2_4 extend in the first direction DR1.

The input sensing layer ISP may obtain coordinate information in a mutual-cap method. Capacitance is formed between the transmission electrodes SE1_1 to SE1_5 and the reception electrodes SE2_1 to SE2_4. The capacitance between the transmission electrodes SE1_1 to SE1_5 and the reception electrodes SE2_1 to SE2_4 may be changed by the external input TC (see FIG. 1) by the body of the user US (see FIG. 1). In an embodiment of the present disclosure, the capacitance between the transmission electrodes SE1_1 to SE1_5 and the reception electrodes SE2_1 to SE2_4 may be changed by an external input caused by an input device other than the body of the user US. Herein, the sensing sensitivity of the input sensing layer ISP may be determined depending on the amount of change in capacitance.

However, the present disclosure is not limited thereto, and the input sensing layer ISP may obtain coordinate information in a self-cap method.

Each of the transmission electrodes SE1_1 to SE1_5 includes first sensor units SSP1 and first connection units CP1 disposed in the effective area AA. Each of the reception electrodes SE2_1 to SE2_4 includes second sensor units SSP2 and second connection units CP2 disposed in the effective area AA.

Two first sensor units disposed at opposite ends of one transmission electrode among the first sensor units SSP1 may have a less than size (e.g., ½ size) than a first sensor unit disposed at the center. Two second sensor units disposed at opposite ends of one reception electrode among the second sensor units SSP2 may have a less than size (e.g., ½ size) than a second sensor unit disposed at the center.

FIG. 6 illustrates the transmission electrodes SE1_1 to SE1_5 and the reception electrodes SE2_1 to SE2_4, according to an embodiment. However, the shapes thereof are not limited thereto. In an embodiment of the present disclosure, each of the transmission electrodes SE1_1 to SE1_5 or each of the reception electrodes SE2_1 to SE2_4 may has a shape (e.g., a bar shape) in which a sensor unit and a connection part are not distinguished from each other. It is illustrated that each of the first sensor units SSP1 or each of the second sensor units SSP2 has a shape of a rhombus, but is not limited thereto. For example, the first sensor units SSP1 and the second sensor units SSP2 may have different polygonal shapes.

The first sensor units SSP1 are arranged in the second direction DR2 within one transmission electrode. The second sensor units SSP2 are arranged in the first direction DR1 within one reception electrode. Each of the first connection units CP1 connects the first sensor units SSP1 adjacent to each other. Each of the second connection units CP2 connects the second sensor units SSP2 adjacent to each other.

Each of the transmission electrodes SE1_1 to SE1_5 and each of the reception electrodes SE2_1 to SE2_4 may have a mesh shape. Each of the transmission electrodes SE1_1 to SE1_5 or each of the reception electrodes SE2_1 to SE2_4 has a mesh shape, and thus parasitic capacitance with electrodes included in the display panel DP (see FIG. 2) may be reduced.

The mesh-shaped transmission electrodes SE1_1 to SE1_5 and the mesh-shaped reception electrodes SE2_1 to SE2_4 may include, but not limited to, silver, aluminum, copper, chromium, nickel, titanium, or the like.

The transmission signal lines SL1_1 to SL1_5 and the reception signal lines SL2_1 to SL2_4 may be disposed in the ineffective area NAA.

The input sensing layer ISP may include input pads I_PD, which extend from ends of the transmission signal lines SL1_1 to SL1_5 and the reception signal lines SL2_1 to SL2_4 and which are disposed in the ineffective area NAA. The input pads I_PD may be electrically connected to the transmission signal lines SL1_1 to SL1_5 and the reception signal lines SL2_1 to SL2_4, respectively. In an embodiment of the present disclosure, the input pads I_PD may include transmission input pads I_PD1, to which the transmission signal lines SL1_1 to SL1_5 are electrically connected, and reception input pads I_PD2 to which the reception signal lines SL2_1 to SL2_4 are electrically connected.

In an embodiment of the present disclosure, a pad area PLD, in which the input pads I_PD are disposed, may be included in the ineffective area NAA. The input pads I_PD may be provided by exposing some of circuit elements disposed in the circuit element layer DP-CL (see FIG. 3) from an intermediate insulating layer included in the circuit element layer DP-CL.

The pad area PLD may further include pixel pads D_PD for connecting the flexible circuit film FCB (see FIG. 2) to the display panel DP (see FIG. 2).

The display device DD may further include a sensing controller ICP that controls an operation of the input sensing layer ISP.

In an embodiment of the present disclosure, the sensing controller ICP may be electrically connected to the input sensing layer ISP. The sensing controller ICP may be electrically connected to the transmission signal lines SL1_1 to SL1_5 and the reception signal lines SL2_1 to SL2_4 through the input pads I_PD.

The sensing controller ICP transmits a driving control signal DCS to the transmission electrodes SE1_1 to SE1_5 and receives sensing signals RS, to which a capacitance change amount between the transmission electrodes SE1_1 to SE1_5 and the reception electrodes SE2_1 to SE2_4 is reflected, from the reception electrodes SE2_1 to SE2_4. In an embodiment of the present disclosure, the driving control signal DCS may be a sensing scan signal sequentially transmitted to each of the transmission electrodes SE1_1 to SE1_5.

Figure 7:
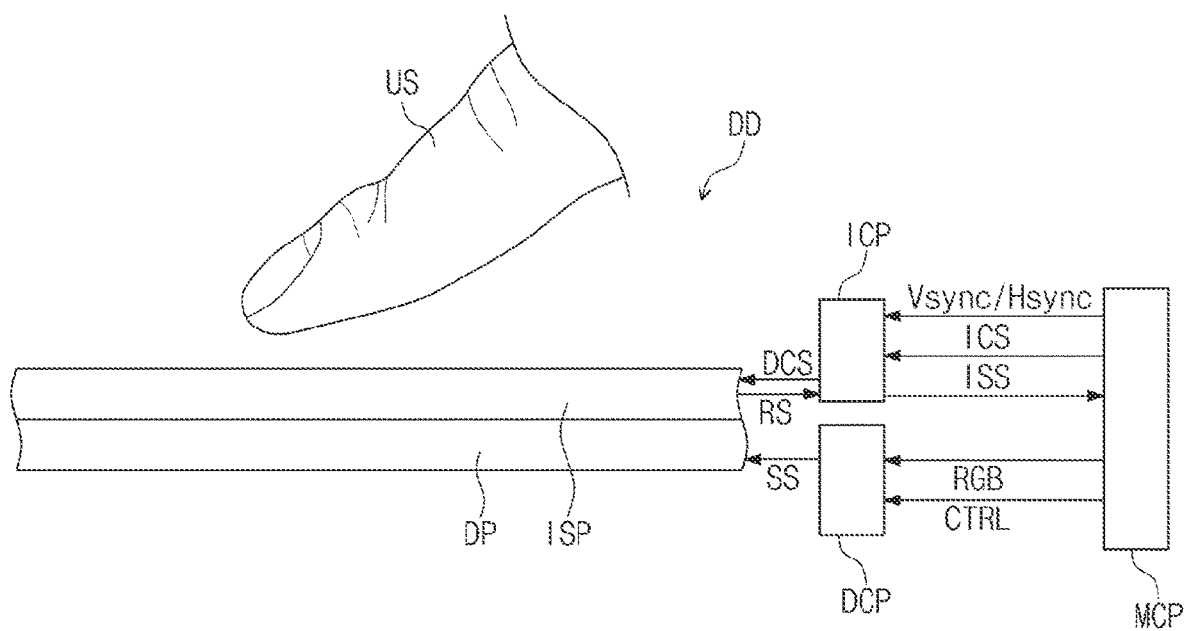
FIG. 7 is a block diagram illustrating a display device, according to an embodiment of the present disclosure.

FIG. 7 is a block diagram illustrating a display device, according to an embodiment of the present disclosure.

Referring to FIG. 7, the display device DD may include the display panel DP, the input sensing layer ISP, a main controller MCP, the display controller DCP, and the sensing controller ICP.

The input sensing layer ISP is disposed on the display panel DP so as to sense an external input. The input sensing layer ISP may sense the external input TC (see FIG. 1) by a body of the user US.

The main controller MCP may control the overall operation of the display device DD. In an embodiment of the present disclosure, the main controller MCP may control operations of the display controller DCP and the sensing controller ICP.

The display controller DCP may receive the image signal RGB and the external control signal CTRL from the main controller MCP. The external control signal CTRL may include various signals. For example, the external control signal CTRL may include the horizontal synchronization signal Hsync, the vertical synchronization signal Vsync, a main clock, and a data enable signal.

The display controller DCP may generate display signals SS for driving the display panel DP based on the image signal RGB and the external control signal CTRL. In an embodiment of the present disclosure, referring to FIG. 4, the display signals SS may include the data signal DS and the scan signals SS1 to SSn.

The sensing controller ICP may control the input sensing layer ISP. The sensing controller ICP may receive a sensing control signal ICS, the vertical synchronization signal Vsync, and the horizontal synchronization signal Hsync from the main controller MCP.

The sensing control signal ICS may include a sensing clock signal, a signal including information about a relationship between an operating frequency of the input sensing layer ISP and an operating frequency of the display panel DP, or the like.

The sensing controller ICP may generate the driving control signal DCS for driving the input sensing layer ISP based on the sensing control signal ICS, the vertical synchronization signal Vsync, and the horizontal synchronization signal Hsync.

The sensing controller ICP may determine the operating frequency of the driving control signal DCS based on the vertical synchronization signal Vsync and the horizontal synchronization signal Hsync. The description that the sensing controller ICP determines the operating frequency of the driving control signal DCS based on the vertical synchronization signal Vsync and the horizontal synchronization signal Hsync will be described later with reference to FIGS. 8 to 12.

The sensing controller ICP may calculate coordinate information of the external input TC (see FIG. 1) based on the sensing signals RS received from the input sensing layer ISP, and may provide a coordinate signal ISS having the coordinate information to the main controller MCP. The main controller MCP executes an operation corresponding to the external input TC of the user US based on the coordinate signal ISS. For example, the main controller MCP may operate the display controller DCP such that a new image is displayed on the display panel DP based on the coordinate signal ISS.

Figure 8:
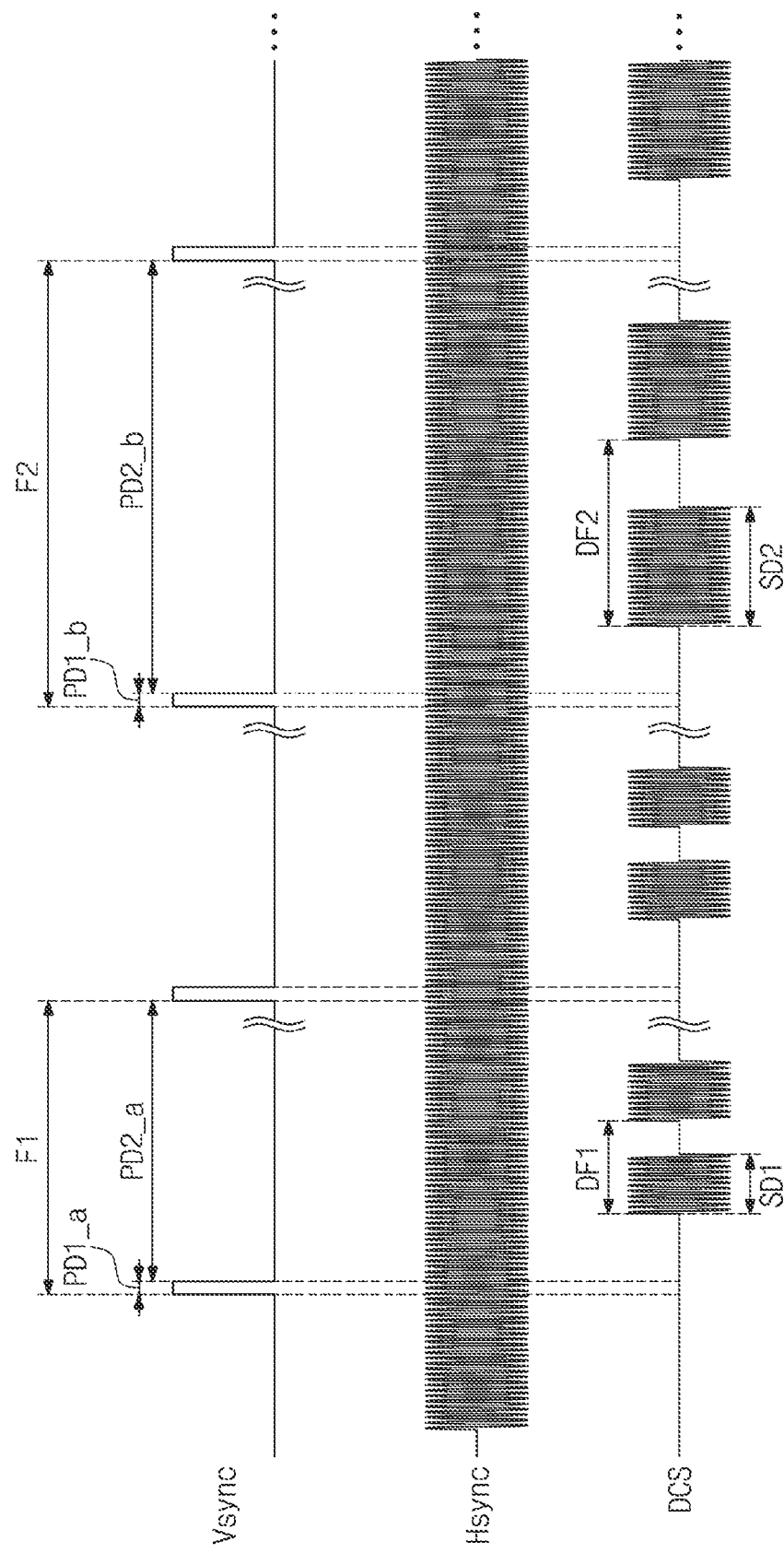
FIG. 8 is a waveform diagram illustrating a vertical synchronization signal, a horizontal synchronization signal, and a driving control signal, according to an embodiment of the present disclosure.

FIG. 8 is a waveform diagram illustrating a vertical synchronization signal, a horizontal synchronization signal, and a driving control signal, according to an embodiment of the present disclosure.

Referring to FIGS. 1, 7, and 8, depending on the image IM displayed on the display panel DP, the display controller DCP may operate in a first mode in which the display panel DP is driven at a first frequency F1 or in a second mode in which the display panel DP is driven at a second frequency F2 less than the first frequency F1. In an embodiment of the present disclosure, when the image IM displayed on the display panel DP is a video, the display controller DCP may operate in the first mode. In an embodiment of the present disclosure, when the image IM displayed on the display panel DP is a still image, the display controller DCP may operate in the second mode. When the display controller DCP operates in the second mode, the power consumption of the display device DD may be reduced.

In an embodiment of the present disclosure, the display controller DCP controls an operation of the display panel DP in synchronization with a frequency of the vertical synchronization signal Vsync. When the display controller DCP operates in the first mode, the frequency of the vertical synchronization signal Vsync may be the first frequency F1. When the display controller DCP operates in the second mode, the frequency of the vertical synchronization signal Vsync may be the second frequency F2. In an embodiment of the present disclosure, when the frequency of the vertical synchronization signal Vsync is the first frequency F1, the operating frequency of the display panel DP may be the first frequency F1. When the frequency of the vertical synchronization signal Vsync is the second frequency F2, the operating frequency of the display panel DP may be the second frequency F2. Accordingly, the operating frequency of the display panel DP may be found based on the frequency information of the vertical synchronization signal Vsync.

When the vertical synchronization signal Vsync is generated at the first frequency F1, one frame (hereinafter, referred to as a "first frame") of the vertical synchronization signal Vsync includes a first vertical section PD1_a and a second vertical section PD2_a.

In an embodiment of the present disclosure, the first vertical section PD1_a may be a section in which no image is displayed on the display panel DP. The second vertical section PD2_a may be a section in which the image IM is displayed on the display panel DP. The display controller DCP may transmit the data signal DS (see FIG. 4) for displaying the image IM to the display panel DP during the second vertical section PD2_a.

When the vertical synchronization signal Vsync is generated at the second frequency F2, one frame (hereinafter, referred to as a "second frame") of the vertical synchronization signal Vsync includes a third vertical section PD1_b and a fourth vertical section PD2_b.

In an embodiment of the present disclosure, duration of the first frame may be different from duration of the second frame. In detail, a width of the first vertical section PD1_a may be identical to a width of the third vertical section PD1_b. However, a width of the fourth vertical section PD2_b may be greater than a width of the second vertical section PD2_a.

The frequency of the horizontal synchronization signal Hsync may be determined depending on the frequency of the vertical synchronization signal Vsync and the number of pixels PX (see FIG. 4) included in the display panel DP. In an embodiment of the present disclosure, as the frequency of the vertical synchronization signal Vsync increases, the frequency of the horizontal synchronization signal Hsyn c may also increase. As the frequency of the vertical synchronization signal Vsync decreases, the frequency of the horizontal synchronization signal Hsync may also decrease.

However, in an embodiment of the present disclosure, although the frequency of the vertical synchronization signal Vsync is changed because the operating frequency of the display panel DP is changed, the frequency of the horizontal synchronization signal Hsync may be uniform. In this case, the gate driving block GDB (see FIG. 4) may generate the scan signals SS1 to SSn (see FIG. 4), which are synchronized with the operating frequency of the display panel DP, based on the horizontal synchronization signal Hsync, a scan clock signal, and a masking signal, and then may transmit the generated scan signals SS1 to SSn to the scan lines SL1 to SLn (see FIG. 4), respectively.

In an embodiment of the present disclosure, although not illustrated in FIG. 8, the horizontal synchronization signal Hsync may further include a blank section. In the blank section, the gate driving block GDB may not transmit the scan signals SS1 to SSn to the scan lines SL1 to SLn.

The driving control signal DCS may have the operating frequencies DF1 and DF2, which are determined based on the vertical synchronization signal Vsync and the horizontal synchronization signal Hsync. In an embodiment of the present disclosure, the sensing controller ICP may determine the operating frequency of the display panel based on the vertical synchronization signal Vsync and the horizontal synchronization signal Hsync. The sensing controller ICP derives information about the operating frequency of the display panel DP based on the vertical synchronization signal Vsync and the horizontal synchronization signal Hsync, and then determines the operating frequency of the input sensing layer ISP with reference to the information about the operating frequency of the display panel DP.

When the operating frequency of the display panel DP is the first frequency F1, the sensing controller ICP may determine that the operating frequency of the driving control signal DCS is the first operating frequency DF1. In an embodiment of the present disclosure, when the operating frequency of the display panel DP is the second frequency F2, the sensing controller ICP may determine that the operating frequency of the driving control signal DCS is the second operating frequency DF2.

In an embodiment of the present disclosure, when the operating frequency of the display panel DP is changed from the first frequency F1 to the second frequency F2, the sensing controller ICP may change the operating frequency of the input sensing layer ISP from the first operating frequency DF1 to the second operating frequency DF2 based on the vertical synchronization signal Vsync and the horizontal synchronization signal Hsync to reflect the change of the operating frequency of the display panel DP to change the operating frequency of the input sensing layer ISP.

In an embodiment of the present disclosure, the sensing control signal ICS (see FIG. 7) may include a signal set such that the first and second operating frequencies DF1 and DF2 of the input sensing layer ISP are twice the first and second frequencies F1 and F2 of the display panel DP. In this case, when the first frequency F1 of the display panel DP is 120 Hertz (Hz), the first operating frequency DF1 of the input sensing layer ISP may be 240 Hz. Also, when the second frequency F2 of the display panel DP is 60 Hz, the second operating frequency DF2 of the input sensing layer ISP may be 120 Hz.

However, the present disclosure is not limited thereto. For example, when it is determined that the operating frequency of the display panel DP is 120 Hz, based on a signal obtained by setting the relationship between the operating frequency of the display panel DP and the operating frequency of the input sensing layer ISP included in the sensing control signal ICS, the operating frequency of the driving control signal may be 200 Hz.

A sensing section when the operating frequency of the driving control signal DCS is the first operating frequency DF1 may be referred to as a "first sensing section SD1". A sensing section when the operating frequency of the driving control signal DCS is the second operating frequency DF2 may be referred to as a "second sensing section SD2". In an embodiment of the present disclosure, the width of the second sensing section SD2 may be greater than the width of the first sensing section SD1. However, the present disclosure is not limited thereto. For example, the width of the first sensing section SD1 may be the same as the width of the second sensing section SD2.

Figure 9A:
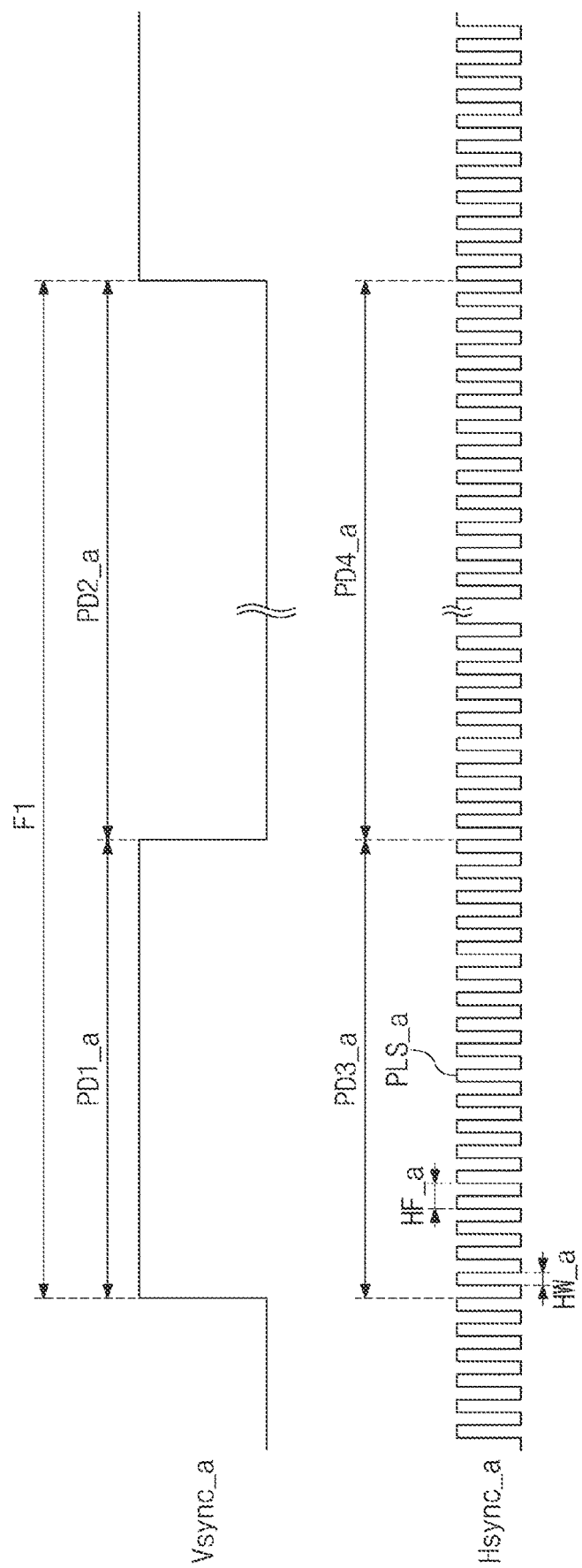
FIGS. 9A, 9B, and 9C are waveform diagrams for describing a change in the number of pulses of a horizontal synchronization signal included in a first vertical section of a vertical synchronization signal, according to an embodiment of the present disclosure.
Figure 9B:
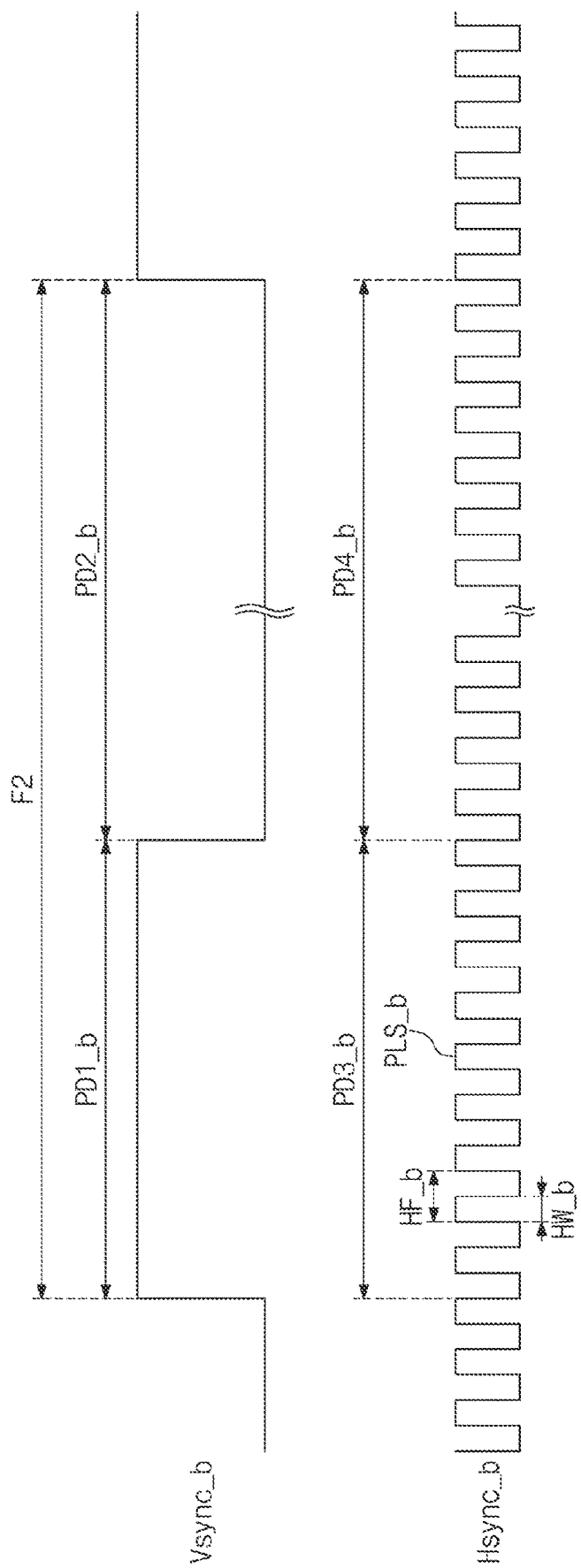
Figure 9C:
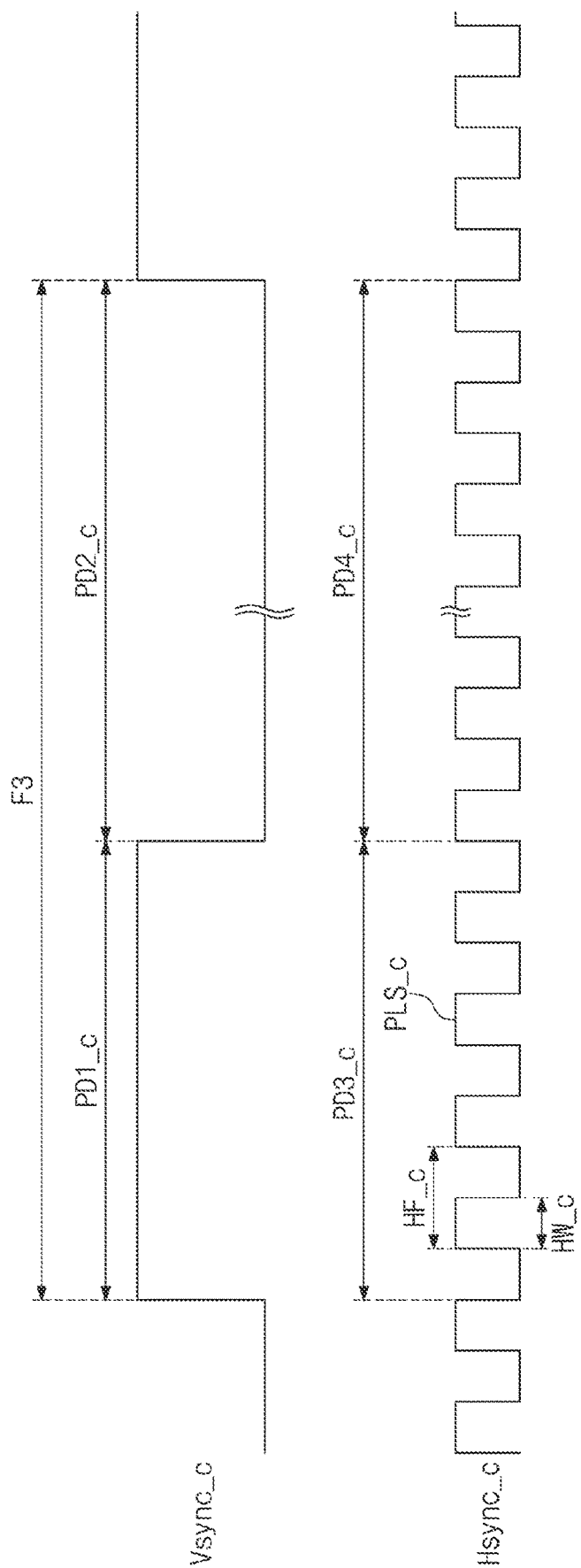

FIGS. 9A to 9C are waveform diagrams for describing a change in the number of pulses of a horizontal synchronization signal included in a first vertical section of a vertical synchronization signal, according to an embodiment of the present disclosure. Hereinafter, configurations the same as configurations described with reference to FIG. 8 are marked by the same reference numerals/symbols, and thus, additional description will be omitted to avoid redundancy.

Referring to FIG. 9A, when a vertical synchronization signal Vsync_a is generated at the first frequency F1, a horizontal synchronization signal Hsync_a includes a first horizontal section PD3_a overlapping with the first vertical section PD1_a and a second horizontal section PD4_a overlapping with the second vertical section PD2_a.

In an embodiment of the present disclosure, the frequency of the horizontal synchronization signal Hsync_a may vary depending on the frequency of the vertical synchronization signal Vsync_a.

The horizontal synchronization signal Hsync_a includes a plurality of pulses PLS_a. When the vertical synchronization signal Vsync_a is generated at the first frequency F1, the pulses PLS_a included in the horizontal synchronization signal Hsync_a may be referred to as "the first pulses PLS_a". In an embodiment of the present disclosure, the sensing controller ICP (see FIG. 7) may determine the operating frequency of the driving control signal DCS based on first pulses PLS_a included in the first horizontal section PD3_a among the first pulses PLS_a of the horizontal synchronization signal Hsync_a.

Specifically, the sensing controller ICP may determine the operating frequency of the driving control signal DCS by counting the number of the first pulses PLS_a of the horizontal synchronization signal Hsync_a included in the first horizontal section PD3_a.

Referring to FIG. 9B, when a vertical synchronization signal Vsync_b is generated at the second frequency F2 less than the first frequency F1 (see FIG. 9A), a horizontal synchronization signal Hsync_b includes a third horizontal section PD3_b overlapping with a third vertical section PD1_b and a fourth horizontal section PD4_b overlapping with a fourth vertical section PD2_b. When the vertical synchronization signal Vsync_b is generated at the second frequency F2, pulses PLS_b included in the horizontal synchronization signal Hsync_b may be referred to as "second pulses PLS_b".

Referring to FIG. 9C, when a vertical synchronization signal Vsync_c is changed to a third frequency F3 less than the second frequency F2 (see FIG. 9B), one frame (hereinafter, referred to as a "third frame") of a vertical synchronization signal Vsync_c includes a fifth vertical section PD1_c and a sixth vertical section PD2_c.

When the vertical synchronization signal Vsync_c is generated at the third frequency F3, the horizontal synchronization signal Hsync_c includes a fifth horizontal section PD3_c overlapping with the fifth vertical section PD1_c and a sixth horizontal section PD4_c overlapping with the sixth vertical section PD2_c. When the vertical synchronization signal Vsync_c is generated at the third frequency F3, pulses PLS_c included in the horizontal synchronization signal Hsync_c may be referred to as "third pulses PLS_c".

Referring to FIGS. 9A to 9C, all of the width of the first vertical section PD1_a, the width of the third vertical section PD1_b, and the width of the fifth vertical section PD1_c are the same as one another.

On the other hand, a width HW_a of each of the first pulses PLS_a is less than a width HW_b of each of the second pulses PLS_b. The width HW_b of each of the second pulses PLS_b is less than a width HW_c of each of the third pulses PLS_c.

The frequency HF_a of the horizontal synchronization signal Hsync_a when the vertical synchronization signal Vsync_a is generated at the first frequency F1 is greater than the frequency HF_b of the horizontal synchronization signal Hsync_b when the vertical synchronization signal Vsync_b is generated at the second frequency F2. The frequency HF_b of the horizontal synchronization signal Hsync_b when the vertical synchronization signal Vsync_b is generated as the second frequency F2 is greater than the frequency HF_c of the horizontal synchronization signal Hsync_c when the vertical synchronization signal Vsync_c is generated as the third frequency F3.

Accordingly, as the frequency at which the vertical synchronization signal is generated decreases, the number of pulses included in the horizontal sections overlapping with a section where no image is displayed on the display panel DP may decrease.

In an embodiment of the present disclosure, assuming that the number of the first pulses PLS_a included in the first horizontal section PD3_a is 'n' when the vertical synchronization signal Vsync_a is generated at the first frequency F1, the number of second pulses PLS_b included in the third horizontal section PD3_b may be 'm' when the vertical synchronization signal Vsync_b is generated with the second frequency F2. In this case, each of 'n' and 'm' may be a natural number that is not less than 1. 'n' may be a natural number greater than 'm'.

The sensing controller ICP may determine the first frequency F1, at which the vertical synchronization signal Vsync_a is generated, and the operating frequency F1 of the display panel DP based on the number of first pulses PLS_a included in the first horizontal section PD3_a. The sensing controller ICP may determine the second frequency F2, at which the vertical synchronization signal Vsync_b is generated, and the operating frequency F2 of the display panel DP based on the number of second pulses PLS_b included in the third horizontal section PD3_b.

When the number of first pulses PLS_a included in the first horizontal section PD3_a is 'n', the sensing controller ICP may determine that the operating frequency of the driving control signal DCS is the first operating frequency. The first operating frequency may be an operating frequency corresponding to the vertical synchronization signal Vsync_a generated at the first frequency F1.

When the number of second pulses PLS_b included in the third horizontal section PD3_b is 'm', the sensing controller ICP may determine that the operating frequency of the driving control signal DCS is a second operating frequency less than the first operating frequency. The second operating frequency may be an operating frequency corresponding to the vertical synchronization signal Vsync_b generated at the second frequency F2.

Figure 10A:
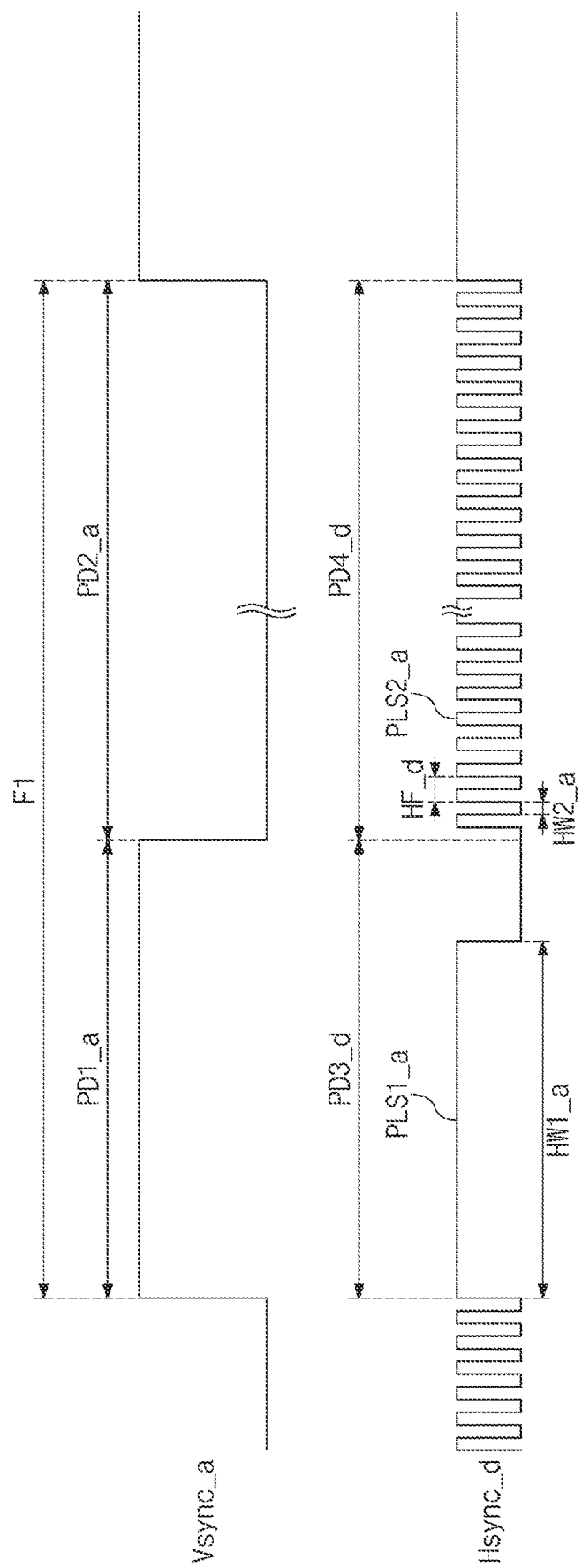
FIGS. 10A, 10B, and 10C are waveform diagrams for describing a change in a pulse width of a horizontal synchronization signal included in a first vertical section of a vertical synchronization signal, according to an embodiment of the present disclosure.
Figure 10B:
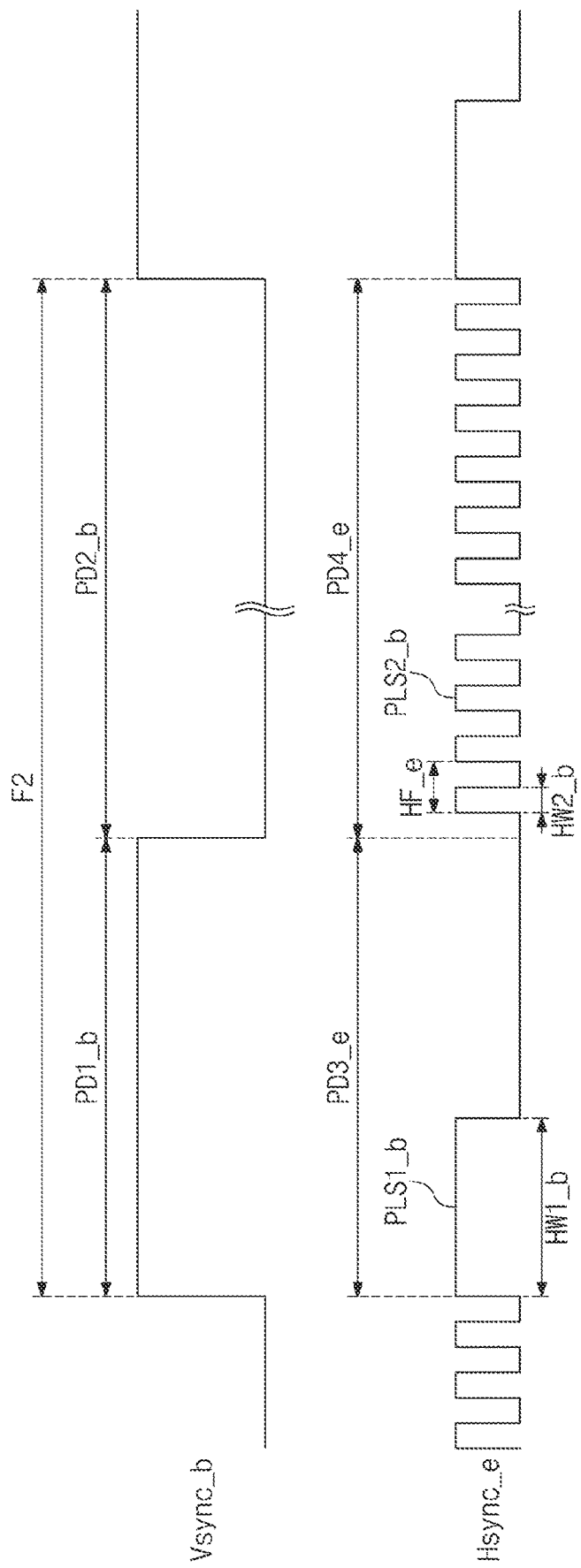
Figure 10C:
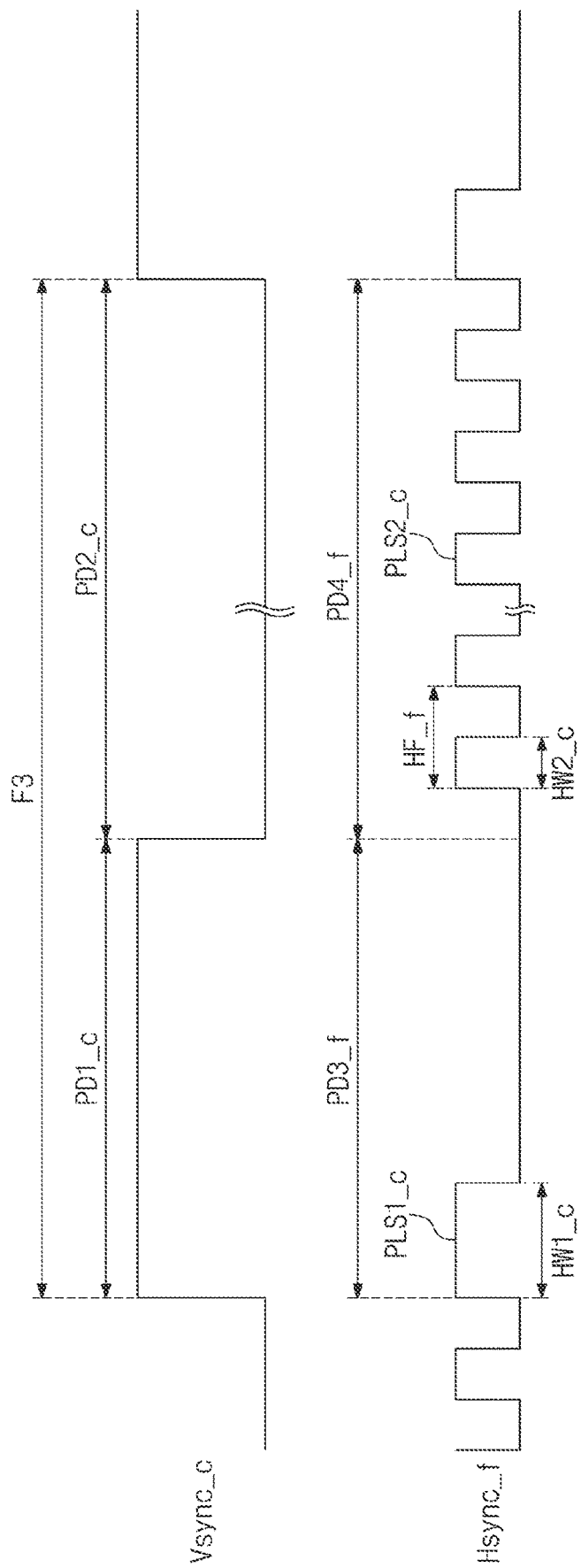

FIGS. 10A to 10C are waveform diagrams for describing a change in a pulse width of a horizontal synchronization signal included in a first vertical section of a vertical synchronization signal, according to an embodiment of the present disclosure. Hereinafter, configurations the same as configurations described with reference to FIGS. 9A to 9C are marked by the same reference numerals/symbols, and thus, additional description will be omitted to avoid redundancy.

Referring to FIG. 10A, when the vertical synchronization signal Vsync_a is generated at the first frequency F1, a horizontal synchronization signal Hsync_d includes a seventh horizontal section PD3_d overlapping with the first vertical section PD1_a and an eighth horizontal section PD4_d overlapping with the second vertical section PD2_a.

The horizontal synchronization signal Hsync_d includes a plurality of pulses (PLS1_a, PLS2_a). The horizontal synchronization signal Hsync_d includes a fourth pulse PLS1_a included in the seventh horizontal section PD3_d and a plurality of fifth pulses PLS2_a included in the eighth horizontal section PD4_d.

In an embodiment of the present disclosure, the frequency of the horizontal synchronization signal Hsync_d may vary depending on the frequency of the vertical synchronization signal Vsync_a. Also, a width HW1_a of the fourth pulse PLS1_a may vary depending on the frequency of the vertical synchronization signal Vsync_a.

In an embodiment of the present disclosure, the width HW1_a of the fourth pulse PLS1_a may be different from a width HW2_a of each of the fifth pulses PLS2_a.

The sensing controller ICP (see FIG. 7) may determine the operating frequency of the driving control signal DCS based on the width HW1_a of the fourth pulse PLS1_a of the horizontal synchronization signal Hsync_d.

Referring to FIG. 10B, when the vertical synchronization signal Vsync_b is generated at the second frequency F2, a horizontal synchronization signal Hsync_e includes a ninth horizontal section PD3_e overlapping with the third vertical section PD1_b and a tenth horizontal section PD4_e overlapping with the fourth vertical section PD2_b.

The horizontal synchronization signal Hsync_e includes a plurality of pulses (PLS1_b, PLS2_b). The horizontal synchronization signal Hsync_e includes the sixth pulse PLS1_b included in the ninth horizontal section PD3_e and the plurality of seventh pulses PLS2_b included in the tenth horizontal section PD4_e.

Referring to FIG. 10C, when the vertical synchronization signal Vsync_c is generated at the third frequency F3, a horizontal synchronization signal Hsync_f includes an eleventh horizontal section PD3_f overlapping with the fifth vertical section PD1_c and a twelfth horizontal section PD4_f overlapping with the sixth vertical section PD2_c.

The horizontal synchronization signal Hsync_f includes a plurality of pulses (PLS1_c, PLS2_c). The horizontal synchronization signal Hsync_f includes the eighth pulse PLS1_c included in the eleventh horizontal section PD3_f and the plurality of ninth pulses PLS2_c included in the twelfth horizontal section PD4_f.

Referring to FIGS. 10A to 10C, all of the width of the first vertical section PD1_a, the width of the third vertical section PD1_b, and the width of the fifth vertical section PD1_c are the same as one another.

On the other hand, a first width HW1_a of the fourth pulse PLS1_a is greater than a second width HW1_b of the sixth pulse PLS1_b. The second width HW1_b of the sixth pulse PLS1_b is greater than a third width HW1_c of the eighth pulse PLS1_c.

Accordingly, as the frequency at which the vertical synchronization signal is generated decreases, the width of a pulse included in the horizontal sections overlapping with the section where no image is displayed on the display panel DP may decrease.

The sensing controller ICP may determine the first frequency F1, at which the vertical synchronization signal Vsync_a is generated, and the operating frequency F1 of the display panel DP based on the first width HW1_a of the fourth pulse PLS1_a included in the seventh horizontal section PD3_d. The sensing controller ICP may determine the second frequency F2, at which the vertical synchronization signal Vsync_b is generated, and the operating frequency F2 of the display panel DP based on the second width HW1_b of the sixth pulse PLS1_b included in the ninth horizontal section PD3_e.

When the width of the fourth pulse PLS1_a is the first width HW1_a, the sensing controller ICP may determine that the operating frequency of the driving control signal DCS is the first operating frequency. The first operating frequency may be an operating frequency corresponding to the vertical synchronization signal Vsync_a generated at the first frequency F1.

When the width of the sixth pulse PLS1_b is the second width HW1_b, the sensing controller ICP may determine that the operating frequency of the driving control signal DCS is a second operating frequency less than the first operating frequency. The second operating frequency may be an operating frequency corresponding to the vertical synchronization signal Vsync_b generated at the second frequency F2.

In an embodiment of the present disclosure, the fifth pulses PLS2_a of the horizontal synchronization signal Hsync_d illustrated in FIG. 10A may have a frequency HF_d and the same pulse width HW2_a as the first pulses PLS_a of the horizontal synchronization signal Hsync_a illustrated in FIG. 9A. The seventh pulses PLS2_b of the horizontal synchronization signal Hsync_e illustrated in FIG. 10B may have a frequency HF_e and the same pulse width HW2_b as the second pulses PLS_b of the horizontal synchronization signal Hsync_b illustrated in FIG. 9B. The ninth pulses PLS2_c of the horizontal synchronization signal Hsync_f illustrated in FIG. 10C may have a frequency HF_f and the same pulse width HW2_c as the third pulses PLS_c of the horizontal synchronization signal Hsync_c illustrated in FIG. 9C.

Figure 11A:
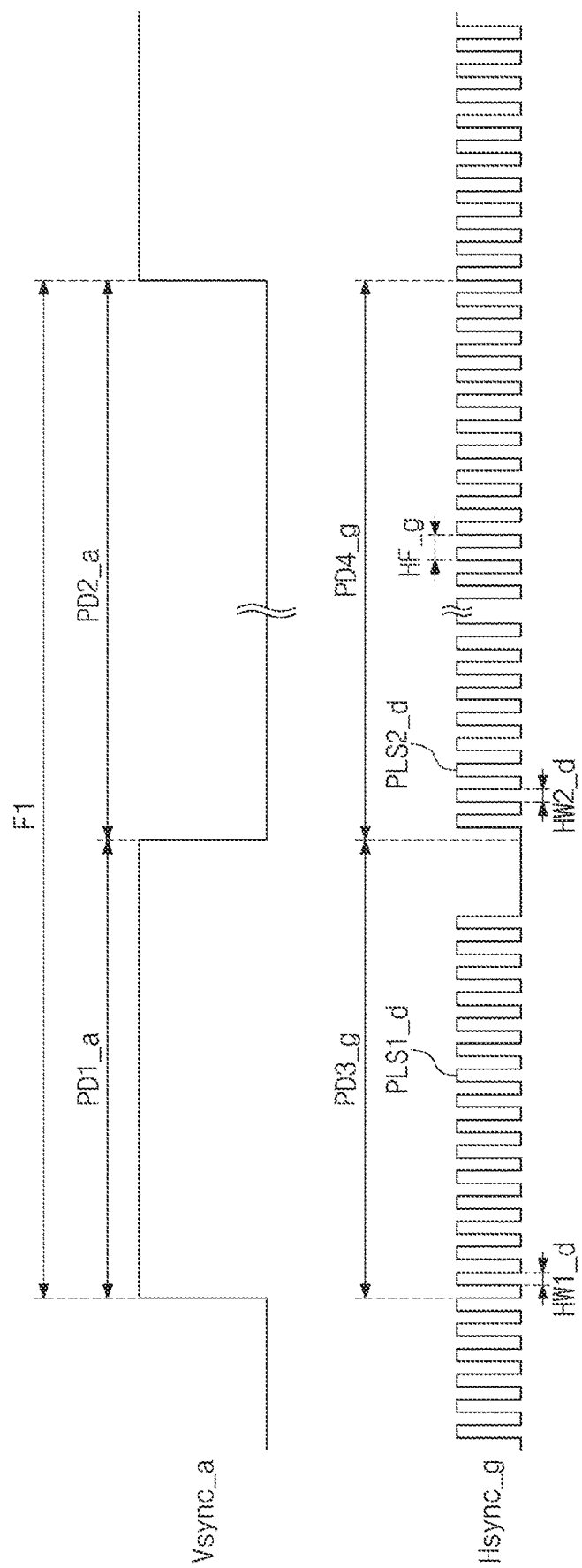
FIGS. 11A and 11B are waveform diagrams for describing a change in the number of pulses of a horizontal synchronization signal included in a first vertical section of a vertical synchronization signal, according to an embodiment of the present disclosure.
Figure 11B:
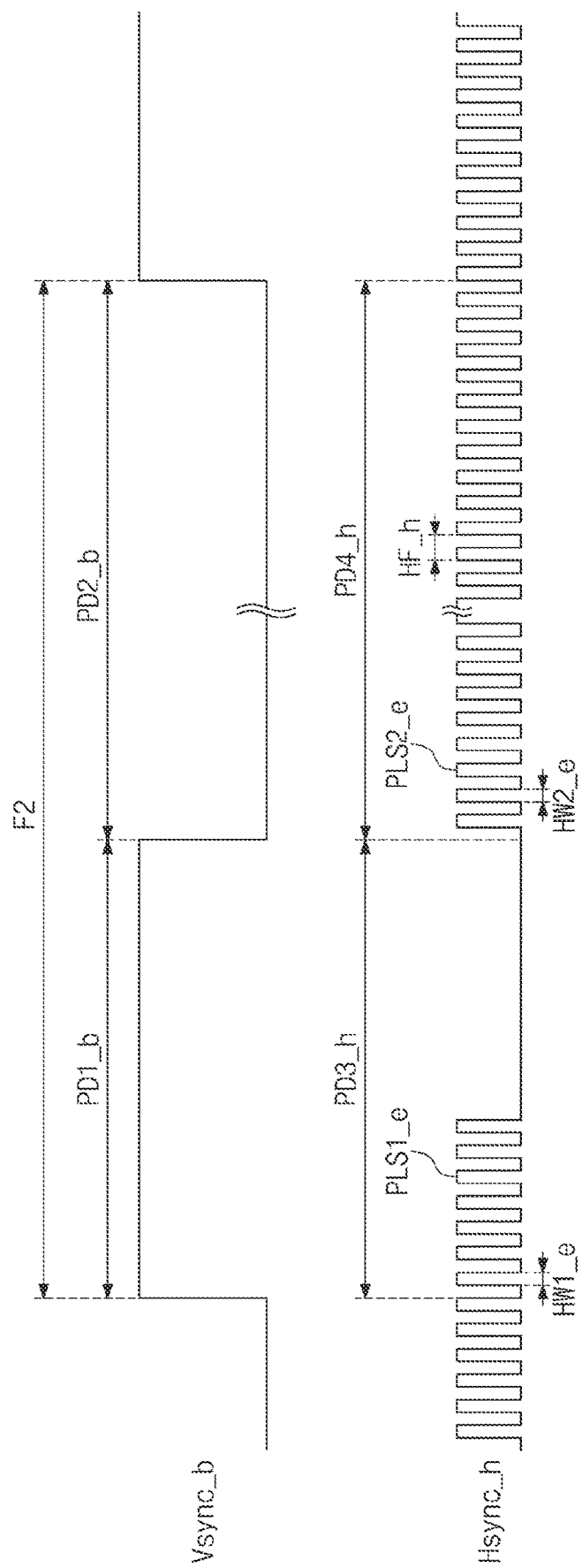

FIGS. 11A and 11B are waveform diagrams for describing a change in the number of pulses of a horizontal synchronization signal included in a first vertical section of a vertical synchronization signal, according to an embodiment of the present disclosure. Hereinafter, configurations the same as configurations described with reference to FIGS. 9A to 10C are marked by the same reference numerals/symbols, and thus, additional description will be omitted to avoid redundancy.

Referring to FIG. 11A, when the vertical synchronization signal Vsync_a is generated at the first frequency F1, a horizontal synchronization signal Hsync_g includes a thirteenth horizontal section PD3_g overlapping with the first vertical section PD1_a and a fourteenth horizontal section PD4_g overlapping with the second vertical section PD2_a.

The horizontal synchronization signal Hsync_g includes a plurality of pulses (PLS1_d, PLS2_d). The horizontal synchronization signal Hsync_g includes a plurality of tenth pulses PLS1_d included in the thirteenth horizontal section PD3_g and a plurality of eleventh pulses PLS2_d included in the fourteenth horizontal section PD4_g.

In an embodiment of the present disclosure, a width HW1_d of each of the tenth pulses PLS1_d may be the same as a width HW2_d of each of the eleventh pulses PLS2_d.

The sensing controller ICP (see FIG. 7) may determine the operating frequency of the driving control signal DCS by counting the number of tenth pulses PLS1_d.

Referring to FIG. 11B, when the vertical synchronization signal Vsync_b is generated at the second frequency F2, a horizontal synchronization signal Hsync_h includes a fifteenth horizontal section PD3_h overlapping with the third vertical section PD1_b and a sixteenth horizontal section PD4_h overlapping with the fourth vertical section PD2_b.

The horizontal synchronization signal Hsync_h includes a plurality of pulses (PLS1_e, PLS2_e). The horizontal synchronization signal Hsync_h includes the plurality of twelfth pulses PLS1_e included in the fifteenth horizontal section PD3_h and the plurality of thirteenth pulses PLS2_e included in the sixteenth horizontal section PD4_h.

In an embodiment of the present disclosure, a width HW1_e of each of the twelfth pulses PLS1_e may be the same as a width HW2_e of each of the thirteenth pulses PLS2_e.

In an embodiment of the present disclosure, the width HW2_d of each of the eleventh pulses PLS2_d may be the same as the width HW2_e of each of the thirteenth pulses PLS2_e.

On the other hand, the number of tenth pulses PLS1_d may be different from the number of twelfth pulses PLS1_e.

In an embodiment of the present disclosure, the number of tenth pulses PLS1_d may be greater than the number of twelfth pulses PLS1_e.

In an embodiment of the present disclosure, assuming that the number of tenth pulses PLS1_d is 'k', the number of twelfth pulses PLS1_e may be 'l'. At this time, each of 'k' and 'l' may be a natural number that is not less than 1. 'k' may be a natural number greater than 'l'.

The sensing controller ICP may determine the first frequency F1, at which the vertical synchronization signal Vsync_a is generated, and the operating frequency F1 of the display panel DP based on the number of tenth pulses PLS1_d. The sensing controller ICP may determine the second frequency F2, at which the vertical synchronization signal Vsync_b is generated, and the operating frequency F2 of the display panel DP based on the number of the twelfth pulses PLS1_e.

When the number of tenth pulses PLS1_d is 'k', the sensing controller ICP may determine that the operating frequency of the driving control signal DCS is the first operating frequency. The first operating frequency may be an operating frequency corresponding to the vertical synchronization signal Vsync_a generated at the first frequency F1.

When the number of twelfth pulses PLS1_e is 'l', the sensing controller ICP may determine that the operating frequency of the driving control signal DCS is a second operating frequency less than the first operating frequency. The second operating frequency may be an operating frequency corresponding to the vertical synchronization signal Vsync_b generated at the second frequency F2.

Figure 12:
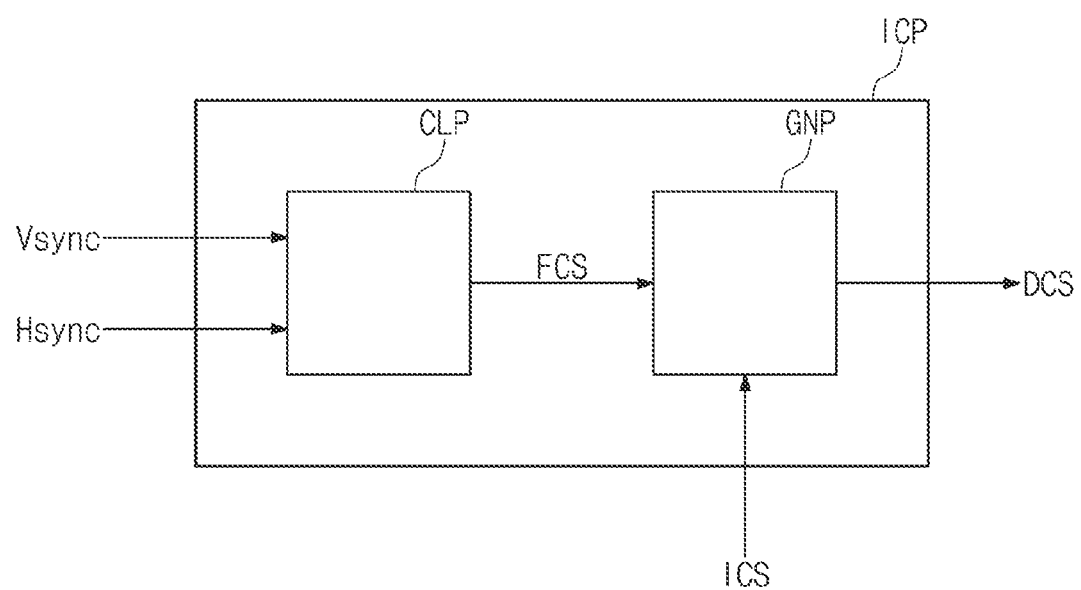
FIG. 12 is a block diagram for describing that a sensing controller generates a driving control signal, according to an embodiment of the present disclosure.

FIG. 12 is a block diagram for describing that a sensing controller generates a driving control signal, according to an embodiment of the present disclosure.

Referring to FIGS. 7 and 12, the sensing controller ICP includes a calculator CLP and a generator GNP.

The calculator CLP receives the vertical synchronization signal Vsync and the horizontal synchronization signal Hsync from the main controller MCP. The calculator CLP may generate a frequency control signal FCS based on the vertical synchronization signal Vsync and the horizontal synchronization signal Hsync. The frequency control signal FCS may include information about a frequency of the vertical synchronization signal Vsync. The operating frequency of the display panel DP may be the same as the frequency of the vertical synchronization signal Vsync. Accordingly, the frequency control signal FCS may include information about the operating frequency of the display panel DP. Although the operating frequency of the display panel DP (see FIG. 1) is changed, the calculator CLP may generate the frequency control signal FCS including information indicating that the operating frequency of the display panel DP has changed, based on the vertical synchronization signal Vsync and the horizontal synchronization signal Hsync of a current frame.

The generator GNP receives the frequency control signal FCS from the calculator CLP, and receives the sensing control signal ICS from the main controller MCP. The generator GNP determines the operating frequency of the driving control signal DCS based on the frequency control signal FCS and the sensing control signal ICS. The generator GNP may determine the operating frequency of the driving control signal DCS based on the frequency control signal FCS so that the change in the operating frequency of the display panel DP is reflected to the operating frequency of the driving control signal DCS in the current frame. Accordingly, the operating frequency of the driving control signal DCS may be prevented from being determined without reflecting the change in the operating frequency of the display panel DP.

When the sensing controller ICP recognizes the operating frequency of the display panel DP based on only the vertical synchronization signal Vsync, the sensing controller ICP fails to reflect the change in the operating frequency of the display panel DP to the operating frequency of the driving control signal DCS, until the sensing controller ICP receives the vertical synchronization signal Vsync of the next frame corresponding to the changed operating frequency of the display panel DP. However, in the case of the present disclosure, the operating frequency of the display panel DP is recognized based on the vertical synchronization signal Vsync and the horizontal synchronization signal Hsync, and thus the sensing controller ICP may recognize that the operating frequency of the display panel DP has been changed, based on only the vertical synchronization signal Vsync and the horizontal synchronization signal Hsync of the current frame. Accordingly, when the operating frequency of the driving control signal DCS is determined, the change of the operating frequency of the display panel DP may be reflected.

In this way, it is possible to minimize noise on the input sensing layer ISP by the display signals SS transmitted to the display panel DP or noise on the display panel DP by the driving control signal DCS transmitted to the input sensing layer ISP.

According to an embodiment of the present disclosure, an operating frequency of a display panel may be determined based on a vertical synchronization signal and a horizontal synchronization signal of the display panel, and the operating frequency of the display panel may be referenced to determine an operating frequency of an input sensing layer. Specifically, it is possible to determine the operating frequency of the display panel based on a pulse of the horizontal synchronization signal included within a specific section of the vertical synchronization signal. Although the operating frequency of the display panel is changed, an operating frequency of the input sensing layer may be determined by reflecting the changed operating frequency of the display panel. In this way, the noise generated between the display panel and the input sensing layer may be reduced.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. A display device comprising:
a display panel configured to display an image;
an input sensing layer disposed on the display panel and configured to sense an input applied from an outside;
a display controller configured to receive a vertical synchronization signal and a horizontal synchronization signal and to control an operation of the display panel depending on the vertical synchronization signal and the horizontal synchronization signal; and a sensing controller configured to receive the vertical synchronization signal and the horizontal synchronization signal and to generate a driving control signal for driving the input sensing layer, wherein one frame of the vertical synchronization signal includes:

a first vertical section; and a second vertical section in which the display controller transmits a data signal for displaying the image to the display panel, and wherein the sensing controller determines an operating frequency of the driving control signal based on a horizontal synchronization signal, which is included in a first horizontal section overlapping with the first vertical section, in the horizontal synchronization signal.

2. The display device of claim 1, wherein the horizontal synchronization signal includes a plurality of pulses, and wherein the sensing controller determines the operating frequency of the driving control signal based on a plurality of pulses, which are included in the first horizontal section, from among pulses of the horizontal synchronization signal.

3. The display device of claim 2, wherein the sensing controller determines the operating frequency of the driving control signal by counting the number of the pulses of the horizontal synchronization signal included in the first horizontal section.

4. The display device of claim 3, wherein the display controller operates in a first mode, in which the display panel is operated at a first frequency, or in a second mode, in which the display panel is operated at a second frequency less than the first frequency, depending on the image, wherein, when the display controller operates in the first mode, a frequency of the vertical synchronization signal is the first frequency, and wherein, when the display controller operates in the second mode, the frequency of the vertical synchronization signal is the second frequency.

5. The display device of claim 4, wherein the number of the pulses included in the first horizontal section is 'n' when the vertical synchronization signal has the first frequency, and the number of the pulses included in the first horizontal section is 'm' when the vertical synchronization signal has the second frequency, each of 'n' and 'm' is a natural number that is not less than 1, and 'n' is a natural number greater than 'm'.

6. The display device of claim 5, wherein, when the number of the pulses included in the first horizontal section is 'n', the operating frequency of the driving control signal is a first operating frequency, and wherein, when the number of the pulses included in the first horizontal section is 'm', the operating frequency of the driving control signal is a second operating frequency less than the first operating frequency.

7. The display device of claim 1, wherein the horizontal synchronization signal includes a plurality of pulses, and wherein the horizontal synchronization signal includes a second horizontal section overlapping with the second vertical section.

8. The display device of claim 7, where pulses of the horizontal synchronization signal include:

a first pulse included in the first horizontal section; and a plurality of second pulses included in the second horizontal section.

9. The display device of claim 8, wherein a width of the first pulse is different from a width of each of the second pulses.

10. The display device of claim 8, wherein the sensing controller determines the operating frequency of the driving control signal based on the width of the first pulse.

11. The display device of claim 10, wherein the display controller operates in a first mode, in which the display panel is operated at a first frequency, or in a second mode, in which the display panel the display panel is operated at a second frequency less than the first frequency, depending on the image.

12. The display device of claim 11, wherein a width of the first pulse is a first width when the display controller operates in the first mode, and the width of the first pulse is a second width when the display controller operates in the second mode, the first width is greater than the second width.

13. The display device of claim 12, wherein when the width of the first pulse is the first width, the operating frequency of the driving control signal is a first operating frequency, and wherein, when the width of the first pulse is the second width, the operating frequency of the driving control signal is a second operating frequency less than the first operating frequency.

14. The display device of claim 11, wherein the width of each of the second pulses when the display controller operates in the first mode is different from the width of each of the second pulses when the display controller operates in the second mode.

15. The display device of claim 14, wherein the width of each of the second pulses when the display controller operates in the first mode is less than the width of each of the second pulses when the display controller operates in the second mode.

16. The display device of claim 7, wherein pulses of the horizontal synchronization signal include:

a plurality of first pulses included in the first horizontal section; and a plurality of second pulses included in the second horizontal section, wherein the display controller operates in a first mode, in which the display panel is operated at a first frequency, or in a second mode, in which the display panel the display panel is operated at a second frequency less than the first frequency, depending on the image, wherein the sensing controller determines the operating frequency of the driving control signal by counting the number of the first pulses, wherein a width of each of the first pulses when the display controller operates in the first mode is equal to the width of each of the first pulses when the display controller operates in the second mode, and wherein the number of the first pulses when the display controller operates in the first mode is different from the number of the first pulses when the display controller operates in the second mode.

17. The display device of claim 16, wherein the number of the first pulses is 'k' when the display controller operates in the first mode, and the number of the first pulses is 'l' when the display controller operates in the second mode, each of 'k' and 'l' is a natural number that is not less than 1, and 'k' is a natural number greater than 'l', wherein, when the number of the first pulses is 'k', the operating frequency of the driving control signal is a first operating frequency, and wherein, when the number of the first pulses is 'l', the operating frequency of the driving control signal is a second operating frequency less than the first operating frequency.

18. The display device of claim 1, wherein the operating frequency of the driving control signal is equal to or greater than a frequency of the vertical synchronization signal.

19. The display device of claim 1, wherein the sensing controller includes:
   a calculator configured to generate a frequency control signal based on a pulse of the horizontal synchronization signal included in the first horizontal section; and
   a generator configured to generate the driving control signal having the operating frequency based on the frequency control signal.

20. The display device of claim 19, wherein the frequency control signal includes information about a frequency of the vertical synchronization signal.

* * * * *